United States Patent
Tsutsumi

(10) Patent No.: US 8,624,413 B2
(45) Date of Patent: Jan. 7, 2014

(54) REGENERATION ENERGY TYPE ELECTRIC GENERATION APPARATUS AND ITS ROTOR FIXING METHOD

(75) Inventor: Kazuhisa Tsutsumi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/397,460

(22) Filed: Feb. 15, 2012

(65) Prior Publication Data

US 2013/0076040 A1 Mar. 28, 2013

Related U.S. Application Data

(63) Continuation of application No. PCT/JP2011/071677, filed on Sep. 22, 2011.

(51) Int. Cl.
*F03D 9/00* (2006.01)
*H02P 9/04* (2006.01)

(52) U.S. Cl.
USPC .......................................................... 290/44

(58) Field of Classification Search
USPC ............ 290/44, 55; 415/2.1, 4.1, 4.2, 4.5, 11; 60/398; 416/14
See application file for complete search history.

(56) References Cited

U.S. PATENT DOCUMENTS

| 4,280,061 | A |   | 7/1981  | Lawson-Tancred |
| 4,372,732 | A | * | 2/1983  | Browning ..................... 416/14 |
| 4,766,779 | A | * | 8/1988  | Massy ......................... 74/731.1 |
| 5,562,417 | A | * | 10/1996 | Grimm et al. ................ 416/137 |
| 7,397,145 | B2 |   | 7/2008  | Struve et al. |
| 7,485,979 | B1 | * | 2/2009  | Staalesen ...................... 290/44 |
| 7,569,943 | B2 |   | 8/2009  | Kovach |
| 8,028,604 | B2 |   | 10/2011 | Moore |
| 8,210,810 | B2 | * | 7/2012  | Egoshi et al. .................... 416/1 |
| 2008/0308980 | A1 |   | 12/2008 | Mitsch |
| 2009/0058095 | A1 | * | 3/2009  | McClintic ...................... 290/55 |

(Continued)

FOREIGN PATENT DOCUMENTS

| CN | 201747854 U | 2/2011 |
| CN | 201982255 U | 9/2011 |

(Continued)

OTHER PUBLICATIONS

International Search Reported dated Dec. 13, 2013, as issued in PCT/JP2011/071677 (Translation only).

(Continued)

*Primary Examiner* — Julio Gonzalez Ramirez
(74) *Attorney, Agent, or Firm* — Lowe Hauptman & Ham, LLP

(57) ABSTRACT

Described is a power generating apparatus and a rotor locking method for the apparatus, which is capable of locking the rotor without using a huge braking mechanism. The power generating apparatus of renewable energy type includes a blade, a rotor including a hub and a main shaft, a hydraulic pump of variable displacement type driven by rotation of the rotor, a hydraulic motor driven by operating oil pressurized by the hydraulic pump, and a generator coupled to the hydraulic motor. The rotor locking method for the power generating apparatus may include the steps of: decelerating the rotor by adjusting a pitch angle of the blade: after the decelerating step, stopping the rotor by applying a braking force by the hydraulic pump to the rotor; and locking the rotor so that the rotor is immovable in a rotation direction.

19 Claims, 11 Drawing Sheets

(56) References Cited

U.S. PATENT DOCUMENTS

| | | |
|---|---|---|
| 2009/0140522 A1 | 6/2009 | Chapple |
| 2010/0032959 A1 | 2/2010 | Nies |
| 2010/0040470 A1 | 2/2010 | Nies et al. |
| 2010/0133817 A1 | 6/2010 | Kinzie |
| 2010/0133903 A1* | 6/2010 | Rufer et al. ............... 307/22 |
| 2010/0194114 A1 | 8/2010 | Pechlivanoglou |
| 2011/0025058 A1* | 2/2011 | Nies ............... 290/44 |
| 2011/0109094 A1* | 5/2011 | Kenway et al. ............ 290/55 |
| 2011/0187107 A1 | 8/2011 | Toyohara |
| 2012/0061958 A1* | 3/2012 | Tsutsumi et al. ........... 290/44 |
| 2012/0104752 A1* | 5/2012 | Tsutsumi et al. ........... 290/44 |
| 2012/0161442 A1* | 6/2012 | Chapple ............... 290/44 |

FOREIGN PATENT DOCUMENTS

| | | | |
|---|---|---|---|
| EP | 1566543 A1 | 8/2005 | |
| EP | 2003362 A2 | 12/2008 | |
| EP | 2151574 A2 | 2/2010 | |
| JP | 57-193781 A | 11/1982 | |
| JP | 2004218436 A | 8/2004 | |
| JP | 2004339953 A | 12/2004 | |
| JP | 2004353525 A | 12/2004 | |
| JP | 2005248738 A | 9/2005 | |
| JP | 2007051584 A | 3/2007 | |
| JP | 2009513882 A | 4/2009 | |
| JP | 2010-31673 A | 2/2010 | |
| JP | 2010281274 A | 12/2010 | |
| WO | 2005090780 A1 | 9/2005 | |
| WO | 2007/053036 A1 | 5/2007 | |
| WO | 20071053036 A1 | 5/2007 | |
| WO | 2008/113699 A2 | 9/2008 | |
| WO | 2009/058022 A1 | 5/2009 | |
| WO | 2010/033035 A1 | 3/2010 | |
| WO | 2010/103086 A2 | 9/2010 | |
| WO | 2011096053 A1 | 8/2011 | |
| WO | 2011104544 A2 | 9/2011 | |

OTHER PUBLICATIONS

International Search Report dated Feb. 21, 2012, as issued in PCT/JP/2011/077625 and English Translation.
International Search Report dated Feb. 20, 2012, as issued in PCT/JP2011/006695.
International Preliminary Report on Patentability dated Jun. 13, 2013, as issued in PCT/JP2011/006695.
International Search Report dated May 29, 2012, as issued in PCT/JP2012/054617 and English Translation.
Extended European Search Report dated May 21, 2013, as issued in European Application No. 13160517.2.
Office Action mailed Jul. 30, 2013 corresponds to Japanese patent application No. 2012-507510.
Office Action mailed Aug. 27, 2013 corresponds to Japanese patent application No. 2012-507512.

* cited by examiner

REGENERATION ENERGY TYPE ELECTRIC GENERATION APPARATUS AND ITS ROTOR FIXING METHOD

RELATED APPLICATIONS

The present application is a continuation of International Application Number PCT/JP2011/071677, filed Sep. 22, 2011, the disclosure of which is hereby incorporated by reference herein in its entirety.

TECHNICAL FIELD

The present invention relates to a power generating apparatus of renewable energy type which transmits rotation energy of a rotor to a generator via a hydraulic pump and a hydraulic motor and a method of locking the rotor thereof. The power generating apparatus of renewable energy type generates power from renewable energy such as wind, tidal current, ocean current and river current. The power generating apparatus of renewable energy type, for instance, includes a wind turbine generator, a tidal generator, an ocean current generator, a river current generator or the like.

BACKGROUND ART

In recent years, from a perspective of preserving the environment, it is becoming popular to use a power generating apparatus of renewable energy type such as a wind turbine generator utilizing wind power and a power generating apparatus utilizing tidal current, ocean current or river current. In the power generating apparatus of renewable energy type, the kinetic energy of the wind, tidal current, river current or the like is converted to the rotation energy of the rotor and the rotation energy of the rotor is then converted into electric power by the generator.

In a general power generating apparatus of renewable energy type, the rotation of the rotor is small compared to the rated rotation speed of the generator and thus, it is common to provide a mechanical step-up gear between the rotor and the generator. By this, the rotation of the rotor is increased to the rated rotation speed of the generator and then the increased rotation is inputted to the generator.

When performing maintenance or fixing the power generating apparatus of renewable energy type, the rotor is fixed (locked) sometimes.

For instance, Patent Literature 1 proposes to stop the rotor in a desired rotational position by applying a braking force to the rotor by a brake mechanism and then to lock the rotor with a locking pin in the desired rotational position. Specifically, the rotor is decelerated by the brake mechanism constituted of a brake disk and a brake shoe and the rotational position of the rotor is detected by a position sensor, and once the rotor comes to a standstill at the desired rotational position, the locking pin is automatically inserted into a locking disk.

In recent years, a development of a power generating apparatus of renewable energy type equipped with a hydraulic transmission formed by a hydraulic pump and a hydraulic motor is promoted, instead of a conventional apparatus equipped with the step-up gear, which makes it difficult to reduce the weight and the cost of the apparatus. Such power generating apparatus of renewable energy type is also disclosed in Patent Literatures 2 and 3.

CITATION LIST

Patent Literature

[Patent Literature 1] U.S. Pat. No. 7,397,145
[Patent Literature 2] US 2010/0032959
[Patent Literature 3] US 2010/0040470

SUMMARY OF INVENTION

Technical Problem

The locking method disclosed in Patent Literature 1, however, uses the disk brake to stop the rotor at the desired rotational position that allows the locking pin to be inserted. The use of the brake disk in the power generating apparatus of renewable energy type with the hydraulic transmission, causes the following issues.

In the power generating apparatus of renewable energy type equipped with the step-up gear, the rotation of the rotor, few to several tens of revolutions per minute, is increased by the step-up gear, for instance, about hundred times and then is inputted to the generator. Therefore, by providing the brake mechanism at the rotation shaft between the step-up gear and the generator, the braking force required is about $\frac{1}{100}$ of the case where the brake disk is arranged on the main shaft between the hub and the step-up gear.

In contrast, the power generating apparatus of renewable energy type equipped with the hydraulic transmission, the rotation shaft between the hydraulic motor rotating at high speed (low torque) and the generator is not coupled to the main shaft between the hub and the hydraulic pump. Thus, the braking mechanism is inevitably mounted to the main shaft disposed between the hub and the hydraulic pump, requiring the braking mechanism to increase in size to apply sufficient braking force to the rotor.

Therefore, as described in Patent Literature 1, it requires an enormous braking mechanism to decelerate and stop the rotor at a desired angular position by means of the braking mechanism.

In view of the above issues, it is an object of the present invention is to provide a power generating apparatus and a rotor locking method for the apparatus, which is capable of locking the rotor without using a huge braking mechanism.

Solution to Problem

As one aspect of the present invention, a rotor locking method for a power generating apparatus of renewable energy type comprising: a rotor including a blade, a hub on which the blade is mounted and a main shaft coupled to the hub; a hydraulic pump of variable displacement type driven by rotation of the rotor; a hydraulic motor driven by operating oil whose pressure is increased by the hydraulic pump; and a generator coupled to the hydraulic motor, may include, but is not limited to:

decelerating the rotor by adjusting a pitch angle of the blade:

after the decelerating step, stopping the rotor by applying a braking force by the hydraulic pump to the rotor; and locking the rotor so that the rotor is immovable in a rotation direction.

For locking the rotor, the locking pin may be inserted in the first hole on the rotor side and the second hole on the nacelle side, or other locking members may be inserted therein.

According to the above rotor locking method, the rotor is decelerated by adjusting the pitch angle of the blade and the rotor is stopped by applying the braking force by the hydraulic pump to the rotor, and then the rotor is finally locked. Therefore, the rotor can be locked without depending on the enormous brake mechanism (the brake disk) which tends to increase in size when being applied to the power generating apparatus of renewable energy equipped with the hydraulic transmission (the hydraulic pump and the hydraulic motor).

In the case of locking the rotor by inserting the locking pin in the first hole on the rotor side and the second hole on the nacelle side, the power generating apparatus of renewable energy type may further include: an encoder which detects an angular position of the rotor; and a high pressure oil line which supplies the operating oil from the hydraulic pump to the hydraulic motor, and in the locking step, a locking pin may be inserted in a first hole formed on a rotor side and a second hole formed on side of a nacelle housing the main shaft, and in the stopping step, at least one of a displacement of the hydraulic pump and a pressure of the operating oil in the high pressure oil line may be adjusted based on a detection result of the encoder and the rotor is stopped in such an angular position that the first hole formed on the rotor side matches with the second hole formed on the nacelle side.

By this, it is possible to stop the rotor at the desired position (where the first hole matches with the second hole) automatically by adjusting at least one of the displacement of the hydraulic pump and the pressure of the operating oil in the high pressure oil line. Therefore, the locking of the rotor can be performed efficiently.

In the case of locking the rotor by inserting the locking pin in the first hole on the rotor side and the second hole on the nacelle side, the rotor locking method may further include the step of:

after the stopping step and before the locking step, matching the first hole formed on the rotor side with the second hole formed on the nacelle side by driving the hydraulic pump by pressurized oil supplied to the hydraulic pump and rotating the rotor.

By driving the hydraulic pump by pressurized oil supplied to the hydraulic pump, the rotor can be rotate by any angle and be stopped at such an angular position that the first hole matches with the second hole.

In the case of driving the hydraulic pump by the pressurized oil and rotating the rotor to match the first hole with the second hole, the power generating apparatus of renewable energy may further include an encoder which detects an angular position of the rotor, and in the matching step, opening and closing of a valve provided in a supply path of supplying the pressurized oil to the hydraulic pump, may be controlled based on a detection result of the encoder so as to match the first hole with the second hole.

By this, it is possible to automate the operation of rotating the rotor using the hydraulic pump and matching the first hole with the second hole. Thus, the locking of the rotor can be performed efficiently.

In the above rotor locking method, the power generating apparatus of renewable energy type may further include: a high pressure oil line which supplies the operating oil from the hydraulic pump to the hydraulic motor; and a low pressure oil line which returns the operating oil from the hydraulic motor to the hydraulic pump, the hydraulic pump may include: a cylinder; a piston sliding in the cylinder in response to the rotation of the rotor; a working chamber formed by the cylinder and the piston; a high pressure valve opening and closing a conduit between the working chamber and the high pressure oil line; and a low pressure valve opening and closing a conduit between the working chamber and the low pressure oil line, and the rotor method may also include the step of:

after the stopping step and before the locking step, temporarily locking the rotor in such a state that the high pressure valve and the low pressure valve are maintained closed.

By maintaining the high pressure valve and the low pressure valve in a closed state, the operating oil is kept in the hydraulic chamber and the piston is immobilized (in a hydraulic locked state), thereby temporarily locking the rotor. Further, when the piston is in the hydraulic locked state, the operating oil leaks to some extend and thus, it is difficult to completely immobilize the rotor. However, this step is extremely useful in temporarily locking the rotor as a temporary measure till the rotor is perfectly locked.

In the above rotor locking method, the power generating apparatus of renewable energy type may further include a high pressure oil line which supplies the operating oil from the hydraulic pump to the hydraulic motor, to the high pressure oil line, an accumulator may be connected via an accumulator valve, and in the stopping step, at least a displacement of the hydraulic motor may be increased and excess of the operating oil in the high pressure oil line is accumulated in the accumulator by opening the accumulator valve.

In such a case that the displacement of the hydraulic pump is increased to increase the braking force (the torque) by the hydraulic pump, the discharge amount of the operating oil from the hydraulic pump increases. This can be solved by accumulating the excess of the operating oil in the high pressure oil line into the accumulator so as to absorb the excess of the operation oil (the high pressure oil) by the accumulator. The operating oil having been accumulated in the accumulator may be released later when needed, and the rotation energy of the rotor is not wasted. For instance, the operating oil may be released from the accumulator to assist the rotation of the hydraulic motor.

In the above rotor locking method for the power generating apparatus of renewable energy type, the power generating apparatus of renewable energy type may further include a high pressure oil line which supplies the operating oil from the hydraulic pump to the hydraulic motor, the hydraulic motor may be a variable displacement type, and in the stopping step, at least a displacement of the hydraulic pump may be increased and excess of the operating oil in the high pressure oil line may be absorbed in the hydraulic motor by temporarily increasing a displacement of the hydraulic motor.

By temporarily increasing a displacement of the hydraulic motor, not only the excess of the operating oil in the high pressure oil line generated by the increased displacement of the hydraulic pump is absorbed by the hydraulic motor but also more electric power is generated in the generator. Therefore, the rotation energy of the rotor is not wasted.

In the above rotor locking method for the power generating apparatus of renewable energy type, the power generating apparatus of renewable energy type may further include: a high pressure oil line which supplies the operating oil from the hydraulic pump to the hydraulic motor; a low pressure oil line which returns the operating oil from the hydraulic motor to the hydraulic pump; a bypass flow path which connects the high pressure oil line to the low pressure oil line and bypasses the hydraulic motor; and a relief valve which is provided in the bypass flow path, and in the stopping step, at least a displacement of the hydraulic pump may be increased and excess of the operating oil in the high pressure oil line may be released to the low pressure oil line via the bypass flow path and the relief valve.

By using the bypass flow path and the relief valve, the excess of the operating oil generated by the increase displacement of the hydraulic pump can be released from the high pressure oil line to the low pressure oil line.

The above power generating apparatus of renewable energy type may be a wind turbine generator which rotates the rotor by wind in a form of renewable energy, input a torque of the rotor to the generator via the hydraulic pump and the hydraulic motor, and generates electric power in the generator.

As another aspect of the present invention, a power generating apparatus of renewable energy type, may include, but is not limited to:

a rotor including a blade, a hub on which the blade is mounted and a main shaft coupled to the hub;

a hydraulic pump of variable displacement type which is driven by rotation of the rotor;

a hydraulic motor which is driven by operating oil whose pressure is increased by the hydraulic pump;

a generator which is coupled to the hydraulic motor;

a pitch drive mechanism which adjusts a pitch angle of the blade to decelerate the rotor;

a pump control unit which controls the hydraulic pump to stop the rotor by applying a braking force by the hydraulic pump to the rotor having been decelerated by the pitch drive mechanism; and a locking unit which locks the rotor so that the rotor is immovable in a rotation direction.

In the above power generating apparatus of renewable energy type, the rotor is decelerated by adjusting the pitch angle of the blade and the rotor is stopped by applying the braking force by the hydraulic pump to the rotor using the pump controller, and then the rotor is finally locked by means of the locking unit, e.g. a locking pin.

Therefore, the rotor can be locked without depending on the enormous brake mechanism (the brake disk) which tends to increase in size when being applied to the power generating apparatus of renewable energy equipped with the hydraulic transmission (the hydraulic pump and the hydraulic motor).

The above power generating apparatus of renewable energy type may further include:

a high pressure oil line which supplies the operating oil from the hydraulic pump to the hydraulic motor; and an encoder which detects an angular position of the rotor, and the locking unit may be a locking pin which is inserted in a first hole formed on a rotor side and a second hole formed on a nacelle side, and the pump control unit may adjust based on a detection result of the encoder at least one of a displacement of the hydraulic pump and a pressure of the operating oil in the high pressure oil line and stop the rotor in such an angular position that the first hole formed on the rotor side matches with the second hole formed on the nacelle side.

By this, it is possible to stop the rotor at the desired position (where the first hole matches with the second hole) automatically by adjusting at least one of the displacement of the hydraulic pump and the pressure of the operating oil in the high pressure oil line by means of the pump controller. Therefore, the locking of the rotor can be performed efficiently.

In the above power generating apparatus of renewable energy type, the locking unit may be a locking pin which is inserted in a first hole formed on a rotor side and a second hole formed on a nacelle side, and the power generating apparatus of renewable energy type may further include:

an encoder which detects an angular position of the rotor;

a pressurized oil source from which pressurized oil is supplied to the hydraulic pump;

a valve which is provided in a supply path of the pressurized oil from the pressurized oil source to the hydraulic pump; and a valve control unit which controls opening and closing of the valve based on a detection result of the encoder to drive the hydraulic pump by the pressurized oil from the pressurized oil source and to rotate the rotor so that the first hole formed on the rotor side matches with the second hole formed on the nacelle side.

By driving the hydraulic pump by the pressurized oil supplied from the pressurized oil source, the rotor can be rotated by an arbitrary degree. Thus, the valve controller controls, based on the detection result of the encoder, the opening and closing of the valve which switches between the allowing and the cutting-off of the pressurized oil to the hydraulic pump from the pressurized oil source. By this, it is possible to stop the rotor at the desired position (where the first hole matches with the second hole) automatically. Therefore, the locking of the rotor can be performed efficiently.

The above power generating apparatus of renewable energy type may further include:

a high pressure oil line which supplies the operating oil from the hydraulic pump to the hydraulic motor; and a low pressure oil line which returns the operating oil from the hydraulic motor to the hydraulic pump, and the hydraulic pump may include: a cylinder; a piston sliding in the cylinder in response to the rotation of the rotor; a working chamber formed by the cylinder and the piston; a high pressure valve opening and closing a conduit between the working chamber and the high pressure oil line; a low pressure valve opening and closing a conduit between the working chamber and the low pressure oil line; and a casing housing the cylinder, the piston, the working chamber, the high pressure valve and the low pressure valve, the supply path of the pressurized oil may extend from the pressurized oil source and penetrates the casing to be in communication with the working chamber, and the valve may be an electromagnetic valve arranged in the supply path of the pressurized oil.

Further, the valve may be attached outside of the casing. For instance, the valve may be attached at an end surface of the casing on a side farther from the hub.

For the hydraulic pump having the piston, the hydraulic chamber, the high pressure valve, the low pressure valve and the casing housing those parts, the high pressure valve or the low pressure valve of a compact type may be used, which is designed to open/close or to assist the opening and closing thereof using the pressure difference between the hydraulic chamber and the high pressure oil line or the low pressure oil line. This type of high pressure valve or the low pressure valve housed in the casing, can be opened and closed only by the pressure difference generated by the reciprocating motion of the piston in response to the rotation of the rotor. Therefore, in the case where the hydraulic pump is driven by the pressurized oil source, the pressure difference cannot be used and thus, the opening and closing of the high pressure valve or the low pressure valve cannot be controlled. To solve this, another valve separately from the high pressure valve or the low pressure valve housed in the casing is provided to switch the supply state of the pressurized oil to the hydraulic pump. This allows the hydraulic pump to be driven positively by the pressurized oil from the pressurized oil source. Further, by attaching the valve at the end surface of the casing on the side farther from the hub, it is possible to utilize the space around the end surface of the casing.

In the above power generating apparatus of renewable energy type, the hydraulic pump may further include a ring cam having a wave-shaped profile of a concave-convex shape which determines a cycle of a reciprocating motion of the piston, a plurality of groups of at least two of the pistons may be provided, said at least two of the pistons having the same phase in the cycle of the reciprocating motion, and the valve may be shared by the at least two of the pistons belonging to each of the groups.

This type of hydraulic pump is typically designed, for the purpose of preventing the pulsation and precisely controlling the displacement, such that a plurality of the pistons reciprocate in different cycles. Further, by providing a plurality of groups of at least two of the pistons having the same phase in the cycle of the reciprocating motion, even when one of the pistons fails, other pistons belonging to the same group as the failed piston can continue operating to achieve the prevention of the pulsation and the precise control of the displacement. In such a case that n pistons have the same phase in the cycle of the reciprocating motion (n is an integer not less than two), a redundancy is n.

Thus, by providing the valve which is shared by the n pistons $52_i$ belonging to the same group having the same phase in the cycle of the reciprocating motion, the valve can open and close in the synchronized timing with the movement of the ring cam and thus, the hydraulic pump can be driven by the pressurized oil from the pressurized oil source. As a result, it is possible to achieve the drive control of the hydraulic pump by the pressurized oil using fewer valves.

In the above power generating apparatus of renewable energy type, the locking unit may be a locking pin which is inserted in a first hole formed on the rotor side and a second hole formed on a side of the nacelle which houses the main shaft, the hydraulic pump may include: a plurality of cylinders; a plurality of pistons each sliding in the cylinder; and a ring cam which is arranged on an outer circumference of the main shaft and has a wave-shaped profile of a concave-convex shape which determines a cycle of a reciprocating motion of the piston, and the wave-shaped profile of the ring cam may be determined so that the first hole matches with the second hole when at least one of the pistons is positioned at a valley of the concave-convex shape of the ring cam.

It is easier to keep the rotor at the angular position where at least one of the pistons is positioned at a valley of the concave-convex shape of the ring cam than to keep the rotor at an angular position where none of the pistons is positioned at the valley of the concave-convex shape of the ring cam. Thus, by determining the wave-shaped profile of the ring cam so that the first hole matches with the second hole when at least one of the pistons is positioned at a valley of the concave-convex shape of the ring cam, the rotor can be easily maintained at the above angular position where the first hole matches with the second hole, after the rotor is stopped at the angular position and until the locking pin is inserted. Therefore, the locking of the rotor can be performed efficiently.

In the above power generating apparatus of renewable energy type, the locking unit may be a locking pin which is inserted in a first hole formed on the rotor side and a second hole formed on a side of the nacelle which houses the main shaft, the power generating apparatus of renewable energy type may further include:

an encoder which detects an angular position of the rotor;

an actuator attached to the locking pin;

a determination unit which determines whether or not the first hole matches with the second hole based on a detection result of the encoder; and an actuator control unit which, when it is determined that the first hole matches with the second hole, causes the actuator to push the locking pin in the first hole and the second hole.

By this, the operation of inserting the locking pin in the first hole and the second hole can be automated using the actuator. Thus, the locking of the rotor can be performed efficiently.

In the above power generating apparatus of renewable energy type, the locking unit may be a locking pin which is inserted in a first hole formed on the rotor side and a second hole formed on a nacelle side, and a tip surface of the locking pin may be chamfered as well as an opening end surface of at least one of the first and second holes which is on a side opposing an insertion direction of the locking pin.

By chamfering the tip surface of the locking pin and the opening end surface of at least one of the first and second holes, the locking pin can be inserted in the first hole and the second hole easily and the rotor can be locked efficiently.

Advantageous Effects of Invention

According to the resent invention, it is possible to perform the locking of the rotor, without using a huge braking mechanism, by adjusting the pitch angle of the blade to decelerate the rotor, applying the braking force by the hydraulic pump to the rotor to stop the rotor and then locking the rotor.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

While the present invention is described with reference to exemplary embodiments, it is obvious to those skilled in the art that various changes may be made without departing from the scope of the invention.

In the following embodiments, a wind turbine generator is described in one form of the power generating apparatus of renewable energy type. However, the present invention is not limited to this and is applicable to other types of power generating apparatus of renewable energy type such as a tidal generator, an ocean current generator and a river current generator.

First Embodiment

Figure 1:
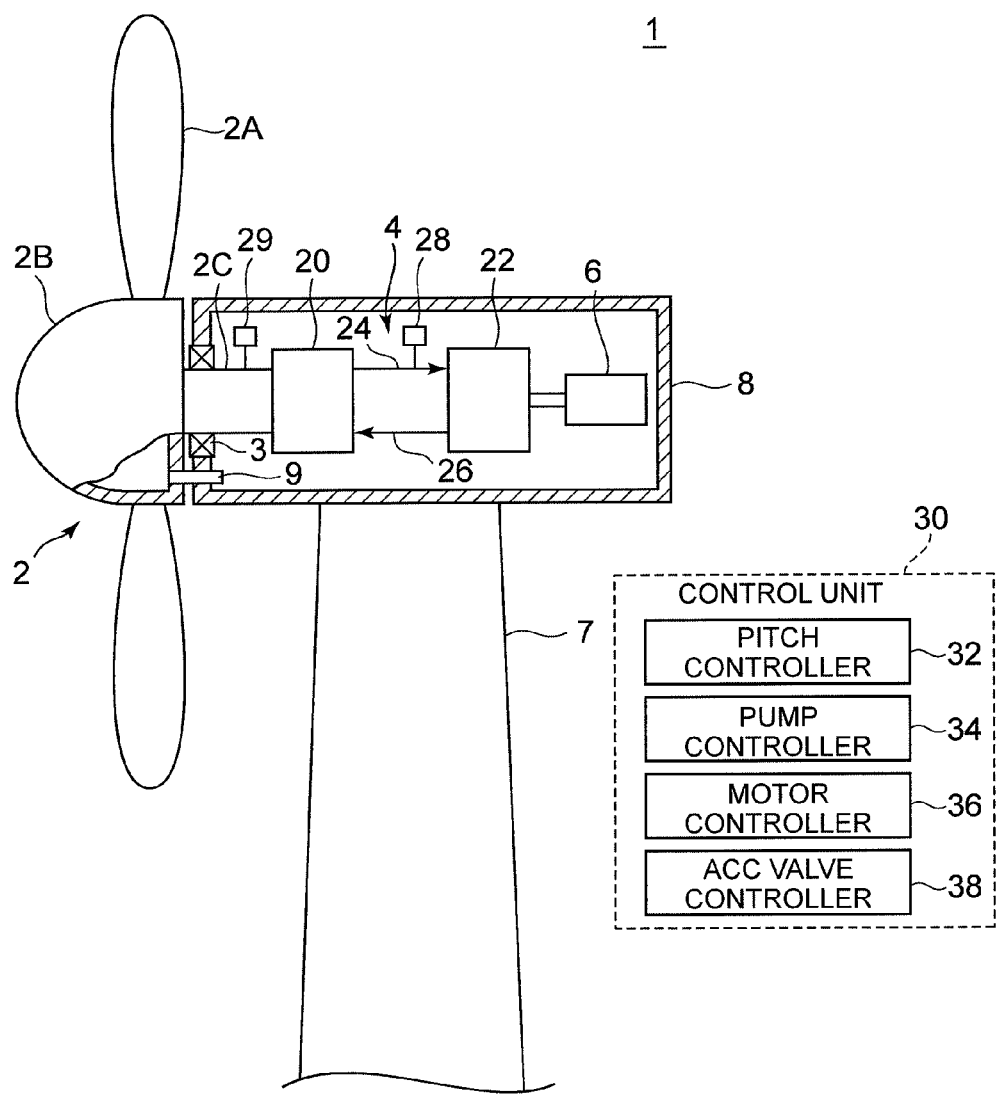
FIG. 1 shows a configuration example of a wind turbine generator regarding a first embodiment.
Figure 2:
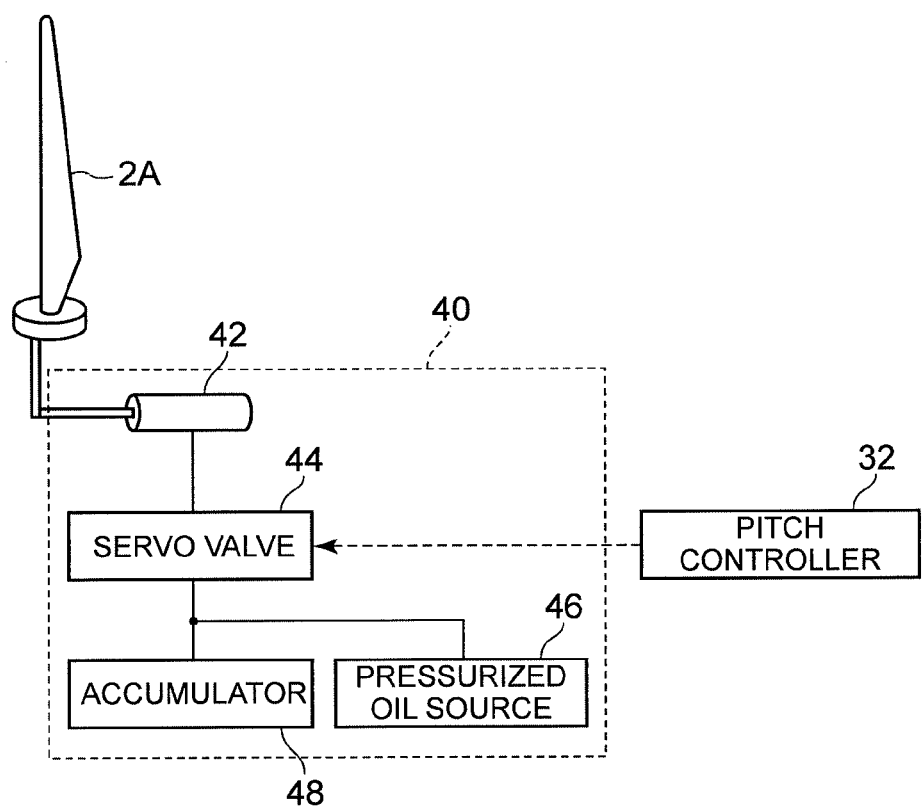
FIG. 2 shows a configuration example of a pitch drive mechanism.
Figure 3A:
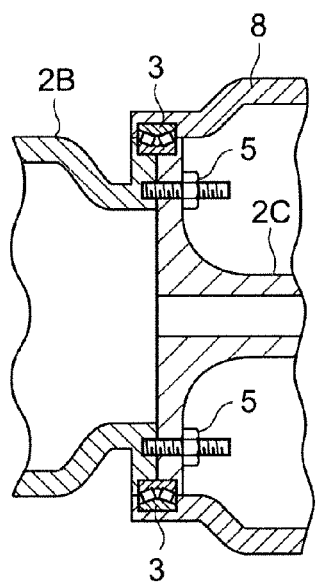
FIG. 3A shows a configuration around locking pins of a hub and a nacelle.
Figure 3B:
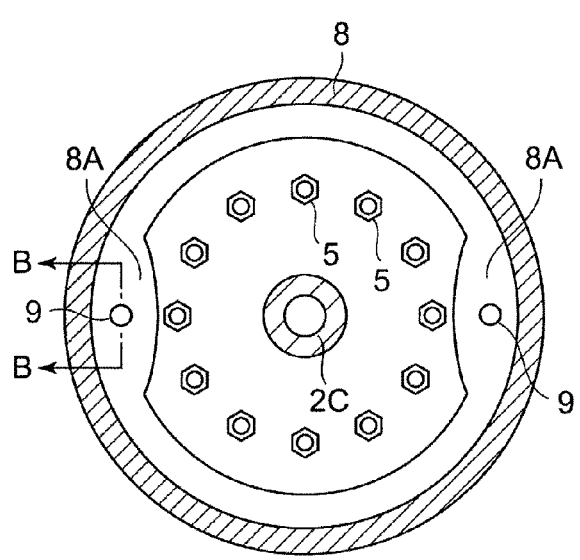
FIG. 3B is a view taken in a direction of an arrow A of FIG. 3A.
Figure 3C:
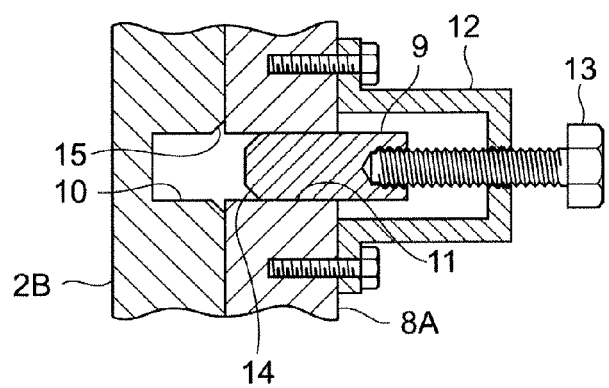
FIG. 3C is a cross-sectional view taken along the line B-B of FIG. 3B.

FIG. 1 shows a configuration example of a wind turbine generator regarding a first embodiment. FIG. 2 shows a configuration example of a pitch drive mechanism. FIG. 3A shows a configuration around locking pins of a hub and a nacelle. FIG. 3B is a view taken in a direction of an arrow A of FIG. 3A. FIG. 3C is a cross-sectional view taken along the line B-B of FIG. 3B.

FIG. 1 shows a wind turbine generator 1 mainly provided with a rotor 2 rotating upon receiving the wind, a hydraulic transmission 4 for accelerating the rotation of the rotor 2, a generator 6 for generating electric power and a control unit 30 for controlling each part of the wind turbine generator 1.

The control unit 30 includes a pitch controller 32 for controlling a pitch drive mechanism 40 described later, a pump controller 34 for controlling a hydraulic pump 20 described later, a motor controller 36 for controlling a hydraulic motor 22 described later and an ACC valve controller 38 for controlling opening/closing of an accumulator valve 62 (62A, 62B) described later.

The rotor 2 is constituted by a blade 2A, a hub 2B on which the blade 2A is mounted, and a main shaft 2C coupled to the hub 2B. By this, wind power acting on the blade 2A rotates the entire rotor 2 and the rotation of the main shaft 2C is inputted to the hydraulic transmission 4. The angular position (rotation displacement) of the rotor 2 is measured by a rotary encoded mounted at the main shaft 2C and then used for controlling the control unit 30.

Herein, the main shaft 2C of the rotor 2 is housed in a nacelle 8 supported rotatably by a tower 7. The nacelle 8 supports the main shaft 2C via a main shaft bearing 3.

The hub 2B houses the pitch drive mechanism 40 shown in FIG. 2. The pitch drive mechanism 40 is formed by a hydraulic cylinder 42, a servo valve 44, a hydraulic power source 46 and an accumulator 48. The servo valve 44 regulates, under control of the pitch controller 32, a supply of a high pressure oil generated in the hydraulic power source 46 and a supply of a high pressure oil stored in the accumulator 48 to the hydraulic cylinder 42 so as to set the pitch angle of the blade 4 to a desired value.

FIG. 2 illustrates the pitch drive mechanism 40 equipped with the hydraulic cylinder 42. However, this is not limitative and an actuator having an arbitrary configuration may be used instead of the hydraulic cylinder 42 to rotate the blade 2A may around its axial line and to adjust the pitch angle. For instance, an electric motor (a servo motor) may be used as the actuator for adjusting the pitch angle. In such case, a control signal from the pitch controller 32 may be inputted to the electric motor and under the control of the pitch controller 32, the pitch angle of the blade 2A may be adjusted using the electric motor.

The rotor 2 is fixable by means of the locking pin 9 shown in FIG. 1. The locking pin 9 is inserted in holes formed on the rotor side 2 and the nacelle side 8, respectively, so as to fix the rotor 2. The configurations of the locking pin 9 and the holes where the locking pin 9 is inserted, are not limited as long as the rotor 2 can be fixed. For instance, the configurations shown in FIG. 3A through FIG. 3C may be applied.

In the examples shown in FIG. 3A through FIG. 3C, the hub 2B and the main shaft 2C are integrally fastened together by a plurality of fastening members 5 and then fixed to an inner ring of the main shaft bearing 3. The hub 2B is formed with the first hole 10 (see FIG. 3C).

In contrast, the nacelle 8 is fixed to an outer ring of the main shaft bearing 3 at its end. As shown in FIG. 3B, the end of the nacelle 8 partially protrudes inward (toward the axial center of the main shaft) to form a convex portion 8A. The convex portion 8A is formed with the second hole 11 (see FIG. 3C).

The locking pin is insertable in the first hole 10 formed in the hub 2B and the second hole 11 formed in the convex portion 8A of the nacelle 8. As shown in FIG. 3C, a cylindrical member 12 is provided around the second hole 11. The cylindrical member 12 is fixed to the convex portion 8A. Into an internal thread formed in the cylindrical member 12, a bolt penetrating through the cylindrical member 12 is screwed as the screw member 13. A tip of the screw member 13 is screwed into a rear end of the locking pin 9. In this manner, by rotating the screw member 13, the locking pin 9 is free of moving forward and backward.

As shown in FIG. 3C, a corner portion 14 of a tip surface of the locking pin is chamfered as well as a corner portion 15 of an opening end surface of the first hole 10 of the hub 2B so as to allow the locking pin 9 to be inserted smoothly. The corner portions 14, 15 may be chamfered by cutting off corners thereof at approximately 45 degrees to form inclined surfaces, or by round-chamfering the corners to round the corners.

FIG. 3C illustrates the case where the corner portion 15 of the opening end surface of the first hole 10 is chamfered. However, this is not limitative and a corner portion of an opening end surface (the opening end surface on the right side in FIG. 3C) of the convex portion 8A of the nacelle which is on a side opposing an insertion direction of the locking pin 9 may be chamfered as well.

Figure 4:
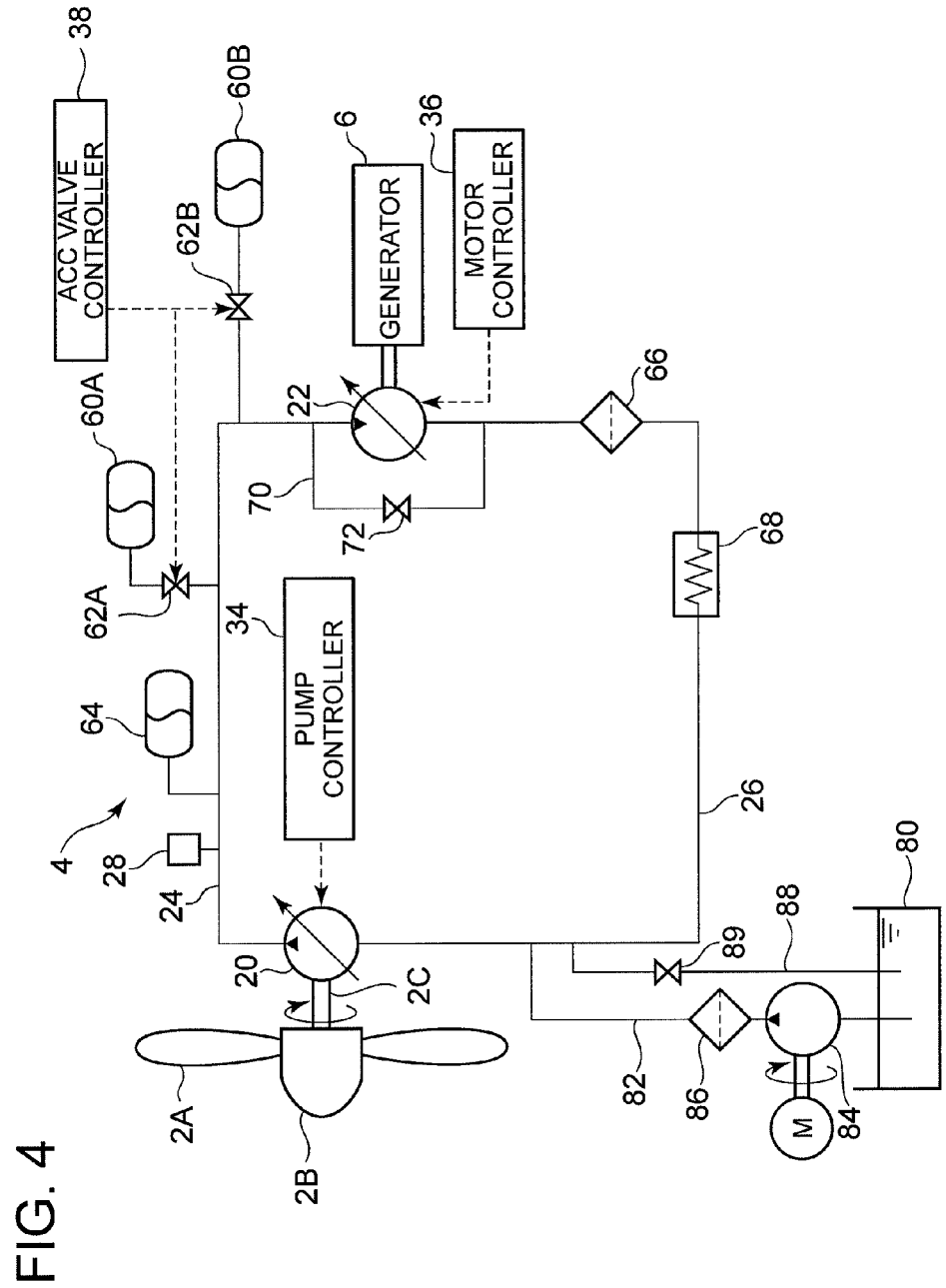
FIG. 4 shows a configuration example of a hydraulic transmission.

The hydraulic transmission 4 shown in FIG. 1 and FIG. 4, includes the hydraulic pump 20 of variable displacement type which is driven by rotation of the main shaft 2C, the hydraulic motor 22 of variable displacement type which is connected to the generator 6, and a high pressure oil line 24 and a low pressure oil line 26 that are arranged between the hydraulic pump 20 and the hydraulic motor 22.

The high pressure line 24 is arranged between a discharge side of the hydraulic pump 20 and an intake side of the hydraulic motor 22. The low pressure oil line 26 is arranged between an intake side of the hydraulic pump 20 and a discharge side of the hydraulic motor 22. The operating oil (high pressure oil) having been discharged from the hydraulic pump 20 enters the hydraulic motor 22 via the high pressure oil line 24 and drives the hydraulic motor 22. The operating oil (low pressure oil) having worked in the hydraulic motor 22 enters the hydraulic pump 20 via the low pressure oil line 26 and then is pressurized in the hydraulic pump 20. Then the pressurized operating oil flows into the hydraulic motor 22 again via the high pressure oil line 24.

To the high pressure oil line 24, an accumulator 60 (60A, 60B) is connected via an accumulator valve 62 (62A, 62B). The accumulator is, for instance, of a bladder type in which gas and the operating oil are separated by a deformable bag (a bladder), or of a piston type. In the accumulator 60, the high pressure operating oil flows into the accumulator 60 during storing the pressure and the bladder deforms or the piston pushes to compress the gas. Meanwhile, during releasing the pressure, the compressed gas expands or high pressure gas is introduced from outside to push the bladder or the piston so that the operating oil is pushed out of the accumulator 60. The opening and closing of the accumulator valve 62 is controlled by the ACC valve controller 38.

In the high pressure oil line 24, a pressure sensor 28 for measuring the pressure of the operating oil in the high pressure oil line 24 and an accumulator 63 for preventing pulsation (pressure fluctuation of the operating oil) are provided.

To the low pressure oil line 26, an oil filter 66 for removing impurities in the operating oil, and an oil cooler 68 for cooling the operating oil 68. Further, an oil tank 80 is connected to the low pressure oil line 26 via a replenishment line 82 and a return line 88.

In the oil tank 80, operating oil for replenishment is stored. The operating oil stored in the oil tank 80 is pumped by a boost pump 84 arranged in the replenishment line 82 and then supplied to the low pressure oil line 26. In this process, the operating oil is filtered by the oil filter 86 arranged in the replenishment line 82 to remove impurities before being supplied to the low pressure oil line 26. In this manner, by replenishing the operating oil in the low pressure oil line 26, even when there is leaking of the operating oil, the amount of the operating oil circulating in the hydraulic transmission 4 can be maintained. In the return line 88 between the low pressure oil line 26 and the oil tank 80, a relief valve 89 is provided to maintain the pressure in the low pressure oil line 26 near a set pressure of the relief valve 89.

Between the high pressure oil line 24 and the low pressure oil line 26, a bypass flow path 70 is provided to bypass the hydraulic motor 22. In the bypass flow path 70, a relief valve 72 is provided to maintain the pressure of the operating oil in the high pressure oil line 24 not greater than the set pressure. Once the pressure of the operating oil in the high pressure oil line 24 increase to the set pressure of the relief valve 72, the relief valve 72 automatically opens to release the high pressure oil to the low pressure oil line 26 through the bypass flow path 70.

The hydraulic pump 20 and the hydraulic motor 22 are variable displacement types which are capable adjusting their displacements. The displacements are controlled by the pump controller 34 and the motor controller 36, respectively.

Figure 5:
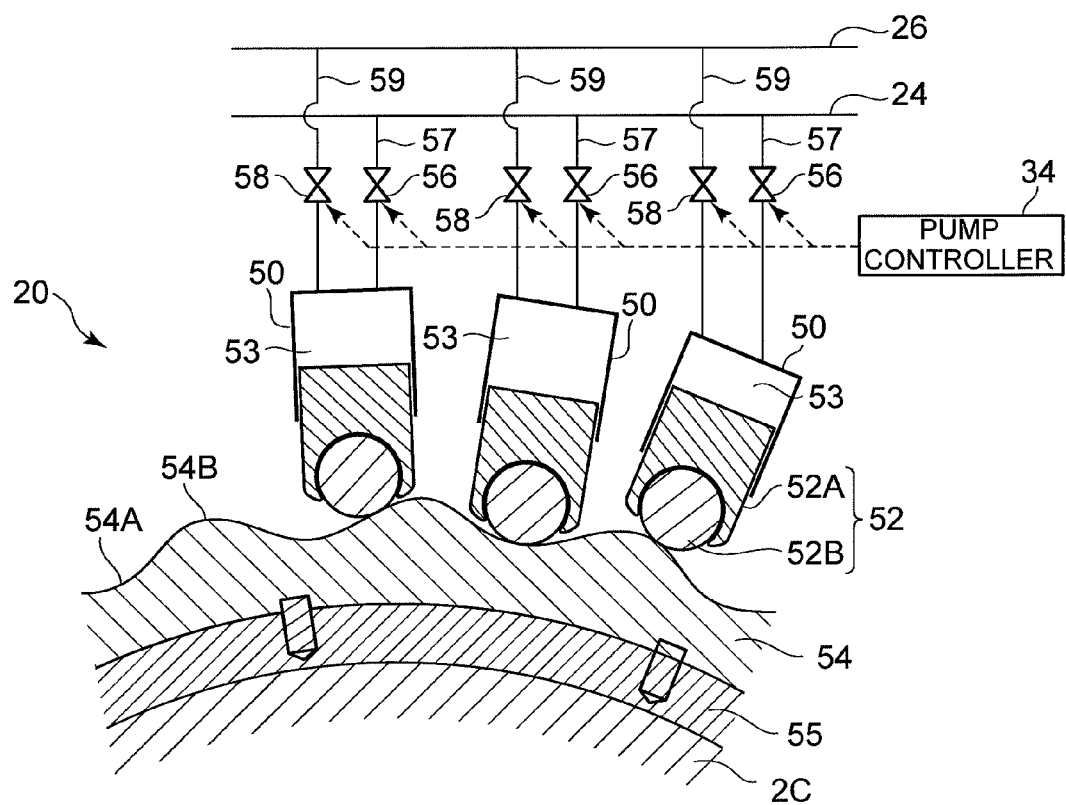
FIG. 5 shows a configuration example of a hydraulic pump.

FIG. 5 shows a configuration example of the hydraulic pump 20. As shown in FIG. 5, the hydraulic pump 20 is constituted by a plurality of hydraulic chambers 53 each formed by a cylinder 50 and a piston 52, a cam 54 having a curve which engages with the pistons 52, and a high pressure valve 56 and a low pressure valve 58 provided for each hydraulic chamber 53.

From the perspective of operating the piston smoothly along the cam curve of the cam 54, the piston 52 may be formed by a piston body 52A slidable in the cylinder 50 and one of a piston roller and a piston shoe which is attached to the piston body 52A and which engages with the cam curve of the cam 54. FIG. 5 illustrates the case where the piston 52 is formed by the piston body 52A and the piston roller 52B.

The cam 54 is mounted to the outer periphery of the main shaft 2C via a cam mount 77. From the perspective of achieving high torque by causing each piston 52 of the hydraulic pump 20 to move up and down for each rotation of the main shaft 2C, the cam 54 may be a ring cam having a wave-shaped profile of a concave-convex shape. The wave-shaped profile of the ring cam includes a plurality of convex portions 54A and concave portions 54B alternately arranged around the main shaft 2C. The wave-shaped profile of the ring cam 54 is determined so that the first hole 10 on the rotor side matches with the second hole 11 on the nacelle side when at least one of the pistons 52 is positioned at a valley of the concave-convex shape of the ring cam 54 (the deepest point of the convex portion 54A). FIG. 5 illustrates a state in which a middle one of three pistons 52 is at the valley of the concave-convex shape of the ring cam 54. By determining the profile of the ring cam 54 in this manner, at least one of the piston rollers 52B is positioned at the valley of the concave-convex shape of the ring cam 54 at such an angular position of the rotor 2 that the first hole 10 matches with the second hole 11. By this, it is made easy to maintain the rotor 2 at the desired angular position. As a result, the locking of the rotor 2 can be performed efficiently.

The high pressure valve 56 is provided in a high pressure conduit 57 between each hydraulic chamber 53 and the high pressure oil line 24. The low pressure valve 58 is provided in a low pressure conduit 59 between each hydraulic chamber 53 and the low pressure oil line 26. The pump controller 34 controls timings of opening and closing of the high pressure valve 56 and the low pressure valve 58.

The pump controller 34 adjusts a displacement $D_P$ of the hydraulic pump 20 by changing a ratio of hydraulic chambers contributing to pressurizing the operating oil (active chambers) to all the hydraulic chambers 53.

For the active chamber among the hydraulic chambers 53, the pump controller 34: opens the high pressure valve 56 and closes the low pressure valve 58 during a pump stroke in which the piston 52 moves from a bottom dead center toward a top dead center; and closes the high pressure valve 56 and opens the low pressure valve 58 in an intake stroke in which the piston 52 moves from the top dead center toward the bottom dead center. By this, the high pressure oil is discharged, during the pump stroke, from the active chamber to the high pressure oil line 24 via the high pressure valve 56 and the low pressure oil is supplied, during the intake stroke, from the low pressure oil line 26 to the active chamber via the low pressure valve 58. In contrast, for the hydraulic chambers (non-active chambers) other than the active chamber, the pump controller 34, the pump controller 34 maintains the high pressure valve 56 closed and the low pressure valve 58 open during a cycle of the piston 52 moving from the bottom dead center to the top dead center and returning to the bottom dead center. Thus, the high pressure oil is not discharged from the non-active chambers to the high pressure oil line 24 without contributing to pressurizing the operating oil.

Herein, both the high pressure valve 56 and the low pressure valve 58 are controlled by the pump controller 34 to adjust opening and closing thereof. However, this is not limitative and the operating oil flowing toward the high pressure oil line 24 alone may be allowed by a check valve which functions as the high pressure valve 56. In such case, while the piston 52 of the hydraulic pump 20 moves from the bottom dead center to the top dead center, the operating oil in the hydraulic chamber 53 is pressurized and the pressure in the hydraulic chamber 53 exceeds the pressure in the high pressure oil line 24, thereby causing the high pressure valve 56 to open automatically. Therefore, there is no need to actively control the high pressure valve 56.

Next, a rotor locking method for the wind turbine generator 1 regarding the embodiment is explained.

In the embodiment, ultimately the rotor 2 is locked by inserting the locking pin 9 in the first hole 10 on the rotor side and the second hole 11 on the nacelle side. This requires, however, the first hole 10 and the second hole 11 to be matched beforehand. Thus, the pitch controller 32 controls the pitch drive mechanism 40 to adjust the pitch angle of the blade 2A, hence decelerating the rotor 2. Then, the pump controller 34 controls the hydraulic pump 20 to apply the braking force by the hydraulic pump 20 to the rotor 2, hence stopping the rotor at the desired angular position. The "desired angular position" herein indicates such an angular position of the rotor 2 that the first hole 10 matches with the second hole 11.

Figure 6:
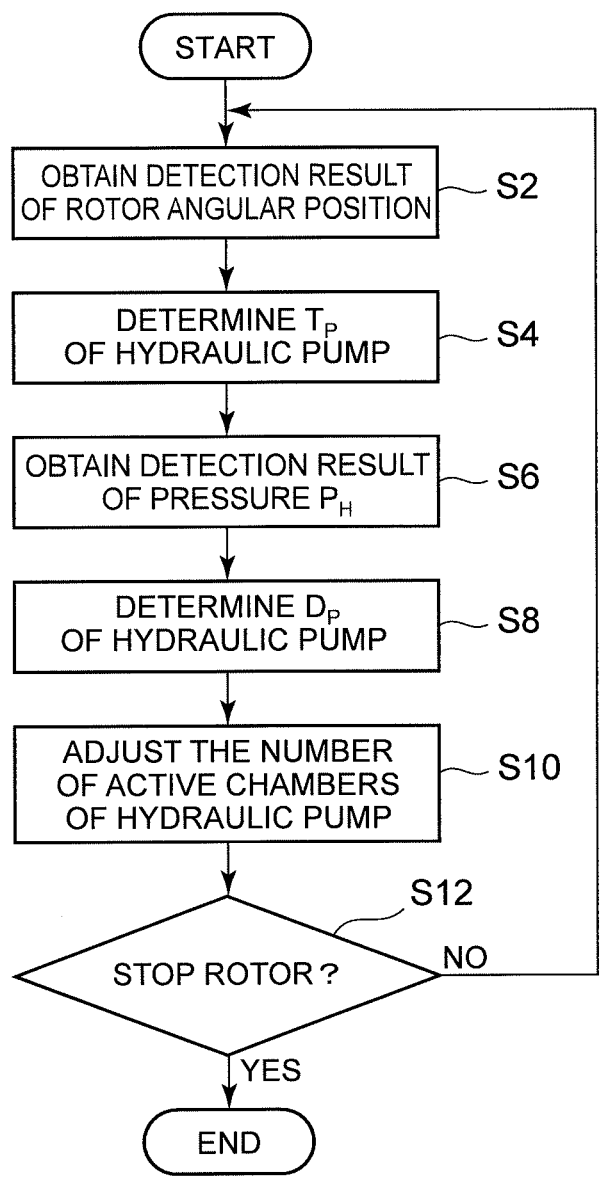
FIG. 6 is a flow chart showing a process of controlling the hydraulic pump using a pump controller to stop a rotor.

FIG. 6 is a flow chart showing a process of controlling the hydraulic pump 20 using the pump controller 34 to stop the rotor 2.

First, the pump controller 34 obtains a result of measuring the angular position (rotation displacement) of the rotor 2 using the rotary encoder 29 (step S2). Then, based on the result of measuring the angular position of the rotor 2, the torque demand $T_P$ of the hydraulic pump 20 is calculated to stop the rotor at the desired angular position (step S4). In the process, the torque demand $T_P$ of the hydraulic pump 20 may be calculated using a formula (1) below.

[Formula 1]

$$I \times \frac{d^2\theta}{dt^2} = T_{aero} - T_P \quad (1)$$

In the formula (1), I is an inertia moment of the rotor 2, θ is an angular position of the rotor 2, t is time, $T_{aero}$ is a torque inputted to the rotor 2 from the wind, and $T_P$ is a torque demand of the hydraulic pump 20.

Further, the pump controller 34 obtains a pressure $P_H$ of the operating oil in the high pressure oil line 24 using the pressure sensor 28 (step S6). Then, the pump controller 34, based on the torque demand of the hydraulic pump 20, $T_P$ and the pressure $P_H$ of the operating oil in the high pressure oil line 24, determines a displacement of the hydraulic pump 20, $D_P$ (step S8). In the process, the displacement $D_P$ of the hydraulic pump 20 may be calculated using a formula (2) below.
[Formula 2]

$$D_P = T_P / P_H \quad (2)$$

Next, the pump controller 34 adjusts the number of active chambers of the hydraulic pump 20 in accordance to a formula (3) below so as to achieve the displacement $D_P$ of the hydraulic pump 20 (step S10).
[Formula 3]

$$D_P = m \times Vp \times Fdp \quad (3)$$

In the formula (3), m is the number of concave-convex of the cam 54, Vp is a total displacement of all the cylinders 50, and Fdp is a ratio of the active chamber to all the hydraulic chambers 53.

Next, the process advances to a step S12 to determine whether or not the rotor 2 is stopped. In the process, the state of the rotor 2 may be determined based on a detected angular position of the rotor 2 detected by the rotary encoder 29. If the rotor 2 is not stopped (NO in the step S12), the process returns to the step S2 to repeat controlling of the hydraulic pump 20.

On the other hand, if the rotor 2 is stopped (YES in the step S12), the process transfers to a locking operation of the rotor 2 by the locking pin 9.

Until the rotor 2 is completely by the locking pin 9, in such a state the high pressure valve 56 and the low pressure valve 58 of the hydraulic pump 20 are maintained closed, the operating oil is kept in the hydraulic chamber 53, the piston 52 being immobilized (in a hydraulic locked state), the rotor being temporarily locked. By this, it is possible to efficiently perform insertion of the locking pin 9 in the first hole 10 and the second hole 11.

By changing the displacement $D_P$ of the hydraulic pump 20 to stop the rotor 2 at the desired angular position, an amount of the operating oil discharged from the hydraulic pump 20, $Q_P$ (=the displacement $D_P \times$ the rotation speed $n_P$ of the hydraulic motor 20) changes as well. This causes the operating oil in the high pressure oil line 24 to be over-supplied or under-supplied. Thus, the opening and closing of the accumulator valve 62 (62A, 62B) may be controlled by the ACC valve controller 38 or the displacement $D_M$ of the hydraulic motor 22 may be controlled by the motor controller 36 so as to absorb excess or supply deficiency of the operating oil in the high pressure oil line 24.

For instance, in such a case that the displacement $D_P$ is increased in the step S8 to increase the braking force (the torque) by the hydraulic pump 20, the discharge amount $Q_P$ of the operating oil from the hydraulic pump 20 increases, thereby generating the excess of the operating oil in the high pressure oil line 24. To solve that, the accumulator valve 62 (62A, 62B) is opened by the ACC valve controller 38 to feed the operating oil from the high pressure oil line 24 to the accumulator 60 (60A, 60B) and then, the accumulator valve 62 (62A, 62B) is closed to accumulate the excess of the operating oil in the accumulator 60 (60A, 60B). The operating oil having been accumulated in the accumulator 60 may be released later when needed, by opening the accumulator valve 62 (62A, 62B) by means of the ACC valve controller 38. For instance, the operating oil may be released from the accumulator 60 (60A, 60B) to assist the rotation of the hydraulic motor 22.

Alternatively, the excess of the operating oil generated by the increased displacement $D_P$ of the hydraulic pump 20, may be absorbed by increasing the displacement $D_M$ of the hydraulic motor 22. In such case, an amount of increase in the displacement of the hydraulic motor 22, $\Delta D_M$ may be determined in accordance to a formula (4) below.
[Formula 4]

$$\Delta D_M = Q_{EXCESS} / n_G \quad (3)$$

In the formula (4), $Q_{EXCESS}$ is the excess amount of the operating oil and $n_G$ is the rotation speed of the generator 6 (i.e. the rotation speed of the hydraulic motor 22). In such case, for an amount corresponding to the amount of increase in the displacement $\Delta D_M$, more electric power is generated in the generator 6

Alternatively, the excess of the operating oil generated by the increased displacement $D_P$ of the hydraulic pump 20 may be released to the low pressure oil line 26 via the bypass flow path 70 by opening the relief valve 72.

When dealing with the excess of the operating oil in the high pressure oil line 24, it is a priority to accumulate the excess of the operating oil in the accumulator 60. And once the accumulator 60 is filled with the operating oil, the displacement $D_M$ of the hydraulic motor 22 is increased. Only when the excess of the operating oil cannot be solved by increasing the displacement $D_M$, the relief valve 72 may be opened. The accumulation of the operating oil is most effective as the operating oil accumulated in the accumulator 60 can be used later when needed and increasing of the displacement $D_M$ is also effective as it leads to more power generation. On the other hand, opening of the relief valve 72 does not help the energy to be effectively used. Further, opening of the relief valve raises the temperature of the operating oil when the operating oil passes through the relief valve. As a result, the temperature of the operating oil needs to be adjusted. In view of these, it is preferable to accumulate the operating oil in the accumulator 60 and to increase the displacement $D_M$ of the hydraulic motor 22 with priority.

In the first embodiment, the rotor 2 is decelerated by adjusting the pitch angle of the blade 2A using the pitch drive mechanism 40, the braking force by the hydraulic pump 20 is applied to the rotor to stop the rotor 2 and then, the rotor 2 is locked by the locking pin 9.

In this manner, the rotor 2 can be locked without depending on the enormous brake mechanism (the brake disk) which tends to increase in size when being applied to the power generating apparatus of renewable energy equipped with the hydraulic transmission (the hydraulic pump and the hydraulic motor).

In the embodiment, the torque demand $T_P$ of the hydraulic pump 20 to stop the rotor 2 at the desired angular position is calculated based on the detection result of the angular position of the rotor 2 and the displacement $D_P$ is determined based on the torque demand $T_P$ and then, the hydraulic pump 20 is controlled to achieve the displacement $D_P$. More specifically, based on the detection result of the rotary encoder 29, the displacement $D_P$ of the hydraulic pump 20 is adjusted and the rotor 2 is stopped at the angular position where the first hole 10 formed on the rotor side matches with the second hole 11 formed on the nacelle side. Thus, it is possible to automatically stop the rotor 2 at the desired angular position (the angular position where the first hole 10 matches with the second hole 11) by adjusting the braking force by the hydraulic pump 20. By this, the locking of the rotor 2 can be performed efficiently.

Second Embodiment

A wind turbine generator regarding a second embodiment is now explained. The wind turbine generator of the second embodiment is substantially the same as the wind turbine generator 1 of the first embodiment except that there is an additional valve is provided to cause the hydraulic pump 20 to carry out the motoring operation. Therefore, mainly the different configurations are explained and the components already described in the first embodiment are indicated with corresponding numbers and are not further explained.

Figure 7:
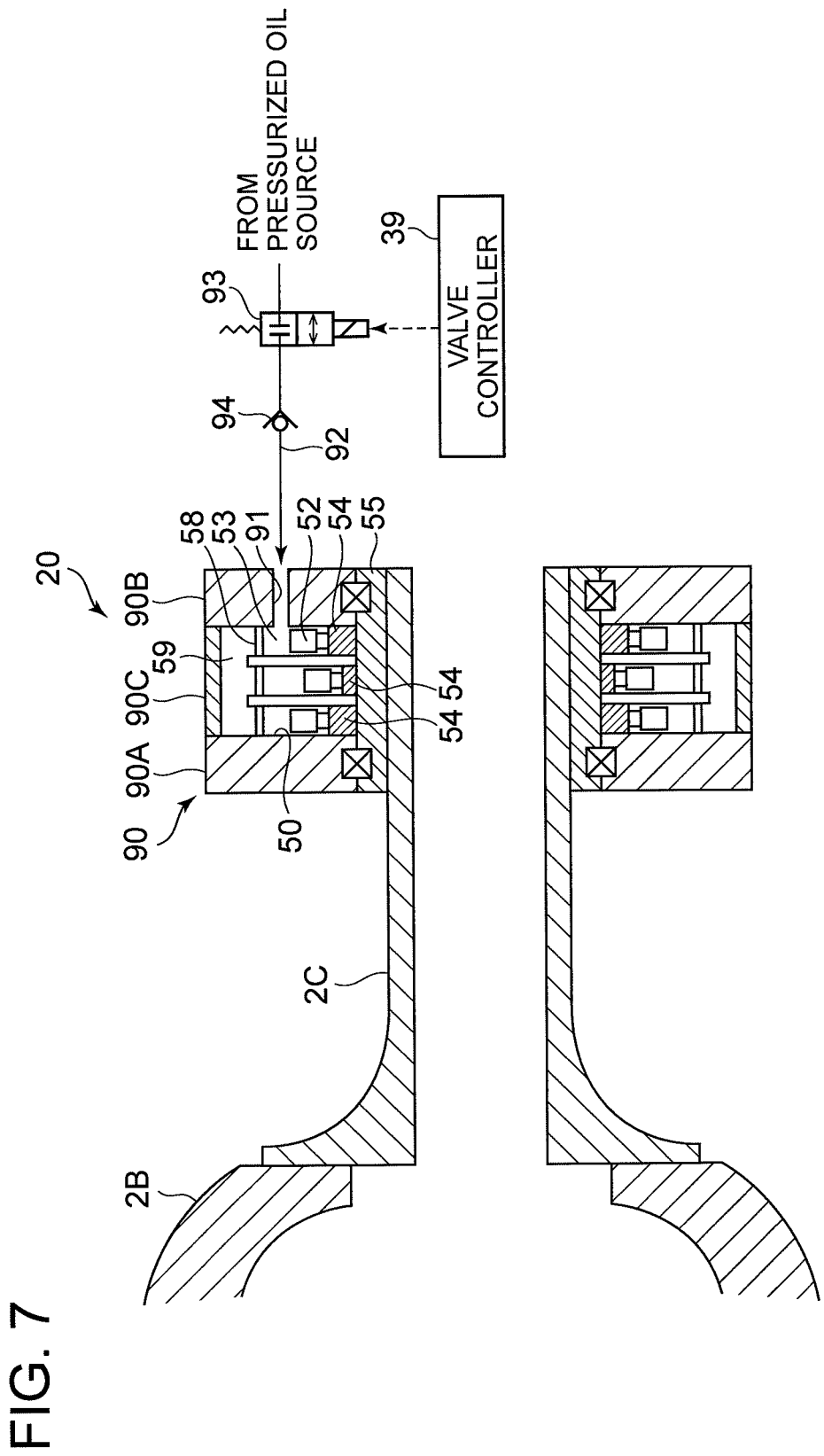
FIG. 7 shows a configuration example of the hydraulic pump having an additional valve for motoring operation.

FIG. 7 shows a configuration example of the hydraulic pump 20 having an additional valve for motoring operation. In the second embodiment, the hydraulic pump 20 is configured such that the cylinder 50, the piston 52, the hydraulic chamber 52, the high pressure valve 56 and the low pressure valve 58 are housed in a casing 90. The high pressure valve 56 is, however, not shown in FIG. 7. The casing 90 is constituted by an end plate 90A forming an end surface on a side closer to the hub 2B of the hydraulic pump 20, an end plate 90B forming an end surface on a side farther from the hub 2B and a cylindrical wall 90C arranged between the end plates (90A, 90B).

The hydraulic pump 20 shown in FIG. 7 is provided with multiple arrays of the ring cams 54 in a longitudinal direction of the main shaft 2C, and corresponding pistons 52 and hydraulic chambers 53.

The end plate 90 on the side farther from the hub 2B is formed with a through-hole 91. The through-hole constitutes a part of a supply path 92 for supplying the pressurized oil from an external pressurized oil source to the hydraulic pump 20 (i.e. the hydraulic chamber 53). The pressurized oil is supplied from the supply path 92 to the hydraulic chamber 53 corresponding to the ring cam (a rear-most ring cam) disposed at the side farthest from the hub 2B among the multiple arrays of the ring cams 54. In this manner, the pressurized oil is supplied to the hydraulic chamber 53 (the first working chamber from the right in FIG. 7) corresponding to the rear-most ring cam 53 from the supply path including the through-hole 91 formed in the end plate 90 on the side farther from the hub 2B. This is because, the hydraulic pump 20 is disposed at the farther end of the main shaft 2C from the hub 2B and it is easy to form the supply path 92 by utilizing the space around the end plate 90B.

In the supply path 92, a solenoid valve 93 of a normally-closed type, and a check valve 94 which allows only the flow of the pressurized oil flowing toward the hydraulic chamber 53 from the pressurized oil source. By exciting and opening the solenoid valve 93, the pressurized oil from the pressurized oil source flows through the check valve 94 and the through-hole 91 to the hydraulic chamber 53 in this order. Next, the pressurized oil pushes down the piston 52 to rotate the ring cam 54 and then is discharged to the low pressure oil line 26 via the low pressure valve 58 and the low pressure conduit 59.

From the perspective of utilizing the space around the end plate 90B, the solenoid valve 93 and the check valve 94 may be attached to an outer surface of the end plate 90B on the side farther from the hub 2B.

Figure 9:
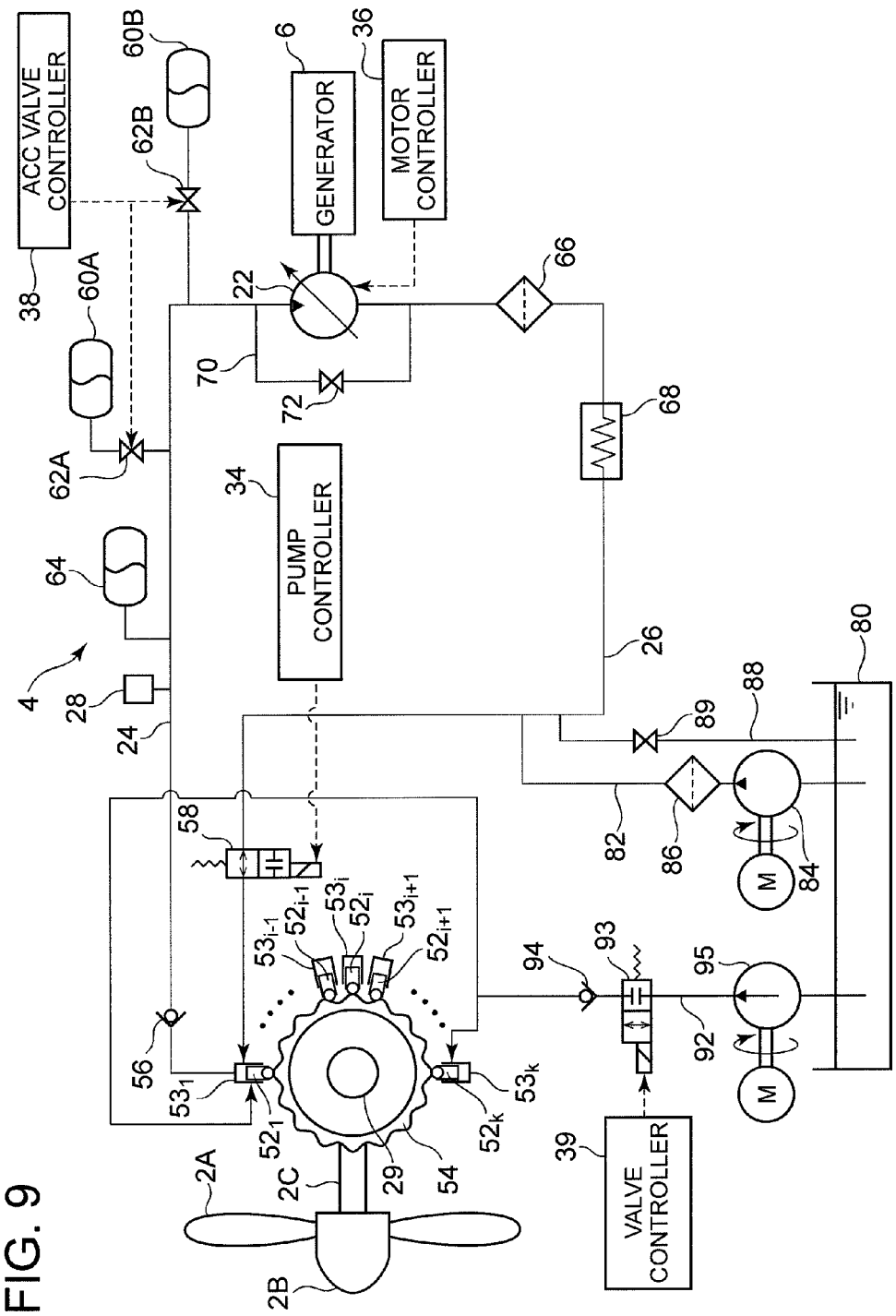
FIG. 9 shows a hydraulic circuit for causing the hydraulic pump to carry out the motoring operation using operating oil circulating in the hydraulic transmission.

Further, the opening and closing of the solenoid valve 93 is controlled by a valve controller 39 and the opening and closing of the low pressure valve 58 is controlled by the pump controller 34 (see FIG. 9). The timings of opening and closing the solenoid valve 93 and the low pressure valve 58 are controlled in a synchronized timing with a cycle of a reciprocating motion of the piston 52.

Figure 8:
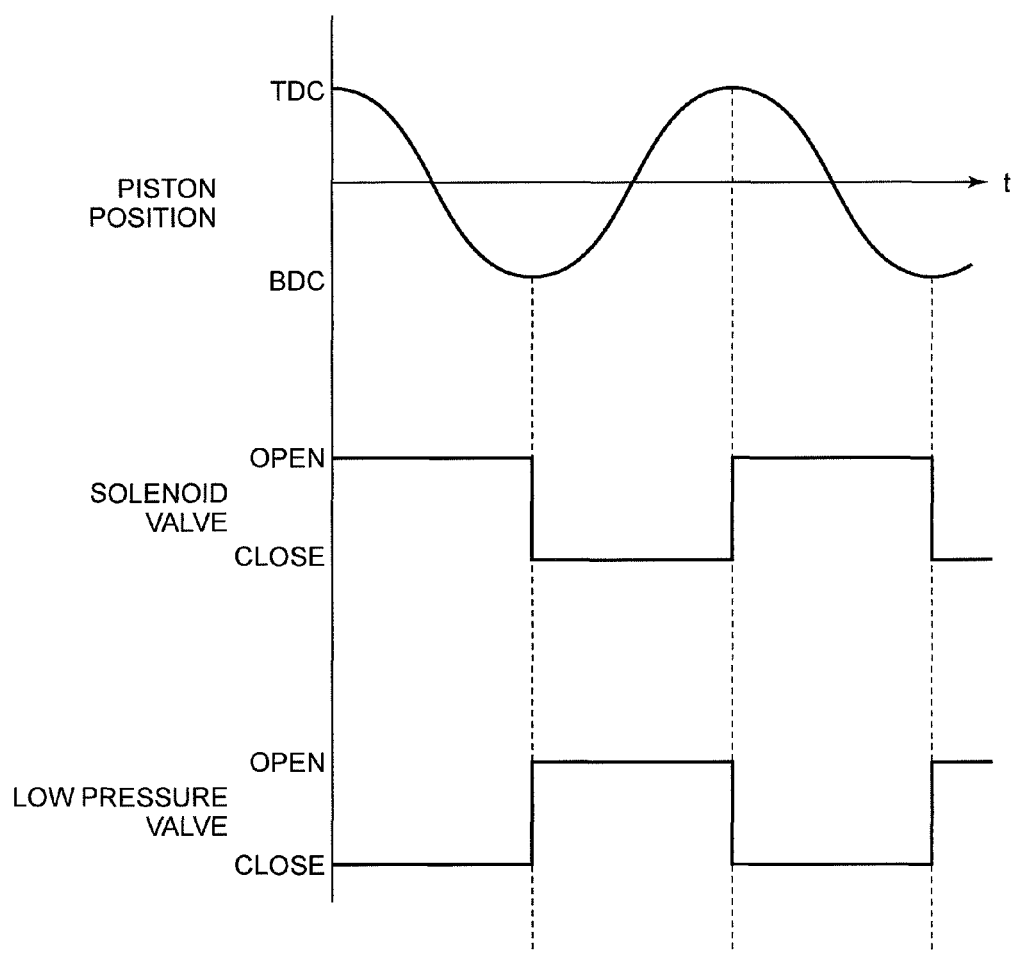
FIG. 8 is a chart showing opening/closing timings of a valve (solenoid valve) for motoring operation and a low pressure valve.

FIG. 8 is a chart showing the opening/closing timings of the solenoid valve 93 and the low pressure valve 58.

As shown in FIG. 8, the solenoid valve 93 is open and the low pressure valve 58 is closed while the piston 52 moves from the top dead center (TDC) to the bottom dead center (BDC). By this, the pressurized oil is supplied to the hydraulic chamber 53 from the pressurized oil source and the piston 52 is pushed down by the pressurized oil, causing the ring cam 54 to rotate (the motor stroke).

On the other, while the piston moves from BDC to TDC, the solenoid valve 93 is closed and the low pressure valve 58 is opened. By this, the pressurized oil having pushed down the piston 52 in the hydraulic chamber 53 is supplied to the low pressure oil line 26 via the low pressure valve 58 and the low pressure conduit 59.

The pressurized oil used for causing the hydraulic pump 20 to carry out the motoring operation, may be the operating oil circulating in the hydraulic transmission 4. In such a case that the pressurized oil supplied to the hydraulic chamber 53 during the motoring operation, is the operating oil circulating in the hydraulic transmission 4, the hydraulic transmission 4 is not adversely affected by this.

FIG. 9 shows a hydraulic circuit for causing the hydraulic pump 20 to carry out the motoring operation using the operating oil circulating in the hydraulic transmission 4.

In the hydraulic circuit shown in FIG. 9, the supply path 92 is arranged between the oil tank 80 storing the low pressure oil and the hydraulic chambers $53_j$ and $53_k$. In the supply path 92 on an upstream side of the solenoid valve 93, a pump 95 as the pressurized oil source is provided. The operating oil pumped by the pump 85 from the oil tank 80 is supplied as the pressurized oil to the hydraulic chambers $53_j$ and $53_k$ via the solenoid valve 93 and the check valve 94.

In the example shown in FIG. 9, in addition to the boost pump 84 for pumping up the operating oil from the oil tank 80 and supplying the operating oil to the low pressure oil line 26 via the replenishment line 82, the pump 95 is also provided as the pressurized oil source. However, this is not limitative and the boost pump 84 may also function as the pressurized oil source.

For the purpose of preventing the pulsation and precisely controlling the displacement $D_P$, the hydraulic pump 20 is typically designed such that a plurality of the pistons 52 reciprocate in different cycles. Further, the hydraulic pump 20 is usually designed by providing a plurality of groups of at least two pistons 52 that have the same phase in the cycle of the reciprocating motion in order to prevent the pulsation and to maintain the precise control of the displacement. In this manner, even when one of the pistons 52 fails, other pistons 52 belonging to the same group as the failed piston 52 can continue operating. In the example shown in FIG. 9, the shape of the ring cam 54 is determined so that the piston $52_j$ reciprocates with the same phase as the piston $52_k$ disposed on the other side of the piston $52_j$. In such case, with two pistons $52_j$ and $52_k$ having the same phase in the cycle of the reciprocating motion, a redundancy is two.

Further, the solenoid valve 93 and the check valve 94 are shared by the two pistons $52_j$ and $52_k$ belonging to the same group. In the synchronized timing with the movement of the ring cam 54, the opening/closing of the solenoid valve 93 is controlled so as to achieve the motoring operation of the hydraulic pump 20. By sharing the solenoid valve 93 and the check valve 94 between the two pistons $52_j$ and $52_k$, the number of the valves (93, 94) can be reduced.

FIG. 9 shows only the supply path 92 arranged between the hydraulic chambers $53_j$ and $53_k$, but the supply path 92 is also connected to other hydraulic chambers 53 in reality. For instance, the supply path 92 may be connected to j hydraulic chambers 53 among all the hydraulic chambers $53_i$ (i=1 to m) corresponding to the rear-most ring cam 54. If the redundancy is n, there are j/n kinds of cycles in the pistons of j hydraulic chambers 53. More specifically, there are j/n sets of pistons 52 that reciprocate in different cycles and thus, the solenoid valve 93 and the check valve 94 are provided for each set of the j/n sets of the pistons 52.

Next, the rotor locking method for the wind turbine generator in relation to the second embodiment is explained.

In the second embodiment, the pitch controller 32 controls the pitch drive mechanism 40 to adjust the pitch angle of the blade 2A, hence decelerating the rotor 2. Then, the pump controller 34 controls the hydraulic pump 20 to apply the braking force by the hydraulic pump 20 to the rotor 2, hence stopping the rotor at the desired angular position. The "desired angular position" herein indicates such an angular position of the rotor 2 that the first hole 10 matches with the second hole 11.

However, there may be a case where it is difficult to stop the rotor 2 with high precision at the desired angular position by adjusting the braking force by the hydraulic pump 20, or a case where, after stopping the rotor 2 at the desired angular position, the rotor 2 still moves, causing misalignment afterward between the first hole 10 and the second hole 11. Therefore, in the second embodiment, after stopping the rotor 2 by applying the braking force by the hydraulic pump 20, the hydraulic pump 20 is driven by the pressurized oil from the pressurized oil source (the pump 95) to rotate the rotor 2 to the desired angular position.

Figure 10:
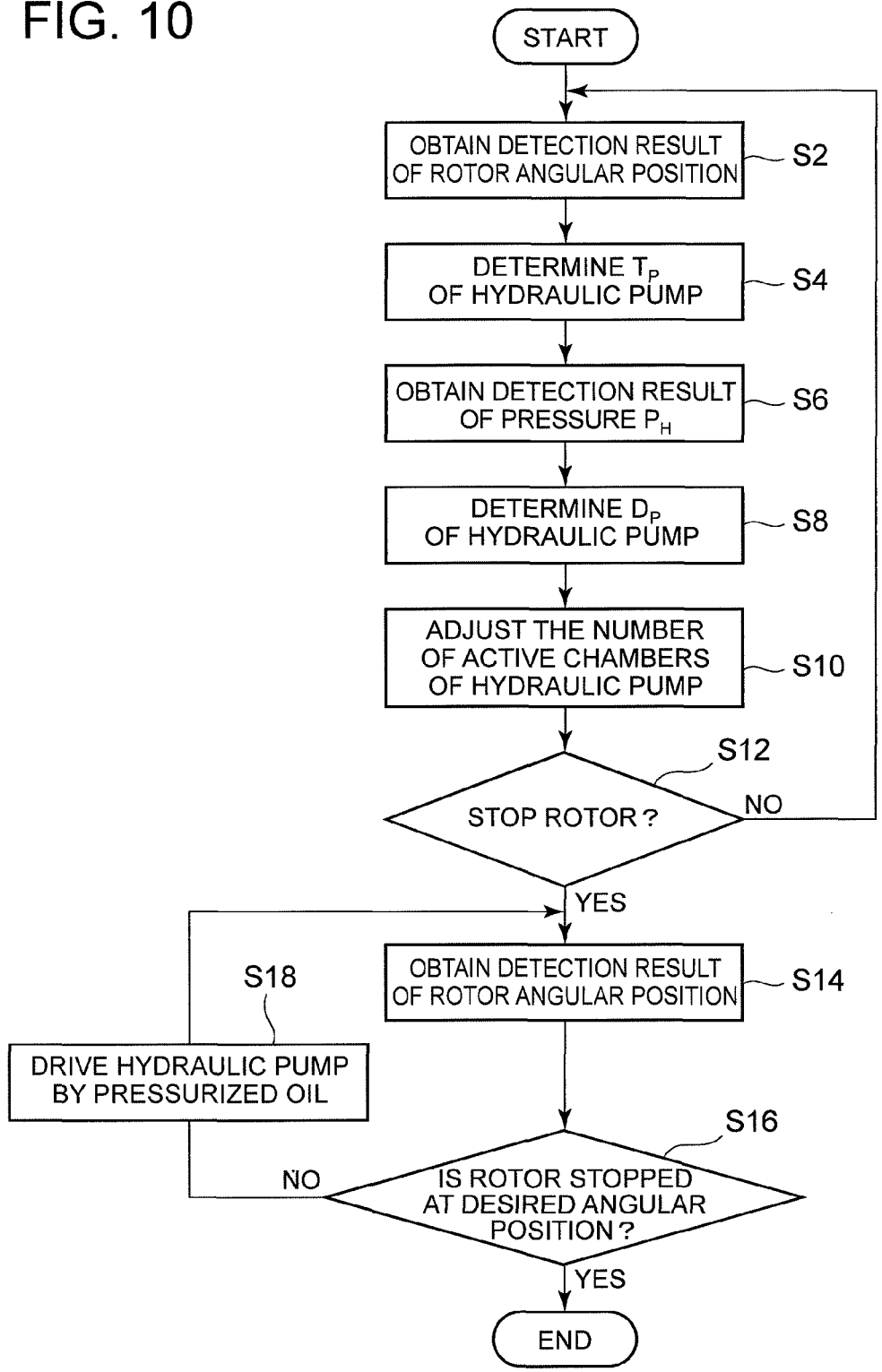
FIG. 10 is a flow chart showing a process of stopping the rotor at a desired angular position.

FIG. 10 is a flow chart showing a process of stopping the rotor 2 at the desired angular position. The steps S2 through S12 are the same as those explained in the first embodiment in reference to FIG. 6 and thus, are not further explained.

As shown in FIG. 10, after the rotor 2 is stopped in accordance to the steps S2 through S12, a detection result of measuring the angular position (rotation displacement) of the rotor 2 using the rotary encoder 29 is obtained (step S14). Then, based on the detection result of the rotary encoder 29, it is determined whether or not the first hole 10 on the rotor side matches with the second hole 11 on the nacelle side, i.e. whether or not the rotor 2 is stopped at the desired angular position (step S16).

If it is determined that the rotor 2 is stopped at the desired angular position (determined as YES in the step S16), the process advances to the insertion of the locking pin 9 without performing the driving of the hydraulic pump 20 by the pressurized oil. In the process, after the rotor 2 is temporarily locked at the desired angular position while maintaining the high pressure valve 56 and the low pressure valve 58 in a closed state, the locking pin 9 may be inserted.

On the other hand, if it is determined that the rotor 2 is not stopped at the desired angular position (determined as NO in the step S16), the process advances to a step S18 to drive the hydraulic pump 20 by the pressurized oil from the pressurized oil source (the pump 95) so as to rotate the rotor 2. In the process, the rotor 2 may be rotated to the desired angular position by controlling the opening and closing of the solenoid valve 93 and the low pressure valve 58 based on the measured angular position of the rotor 2 measured by the rotary encoder 29. For instance, duration of opening/closing of the solenoid valve 93 and the low pressure valve 58 in the timing shown in FIG. 8 may be determined based on the difference between the current angular position and the desired angular position of the rotor 2.

After rotating the rotor 2 by driving the hydraulic pump 20 in the step S18, the process returns to the step S14 and then to the step S16 to determine whether or not the rotor 2 is stopped at the desired position.

In the embodiment, after stopping the rotor 2 by the braking force by the hydraulic pump 20, the pressurized oil is supplied to the hydraulic pump 20 to actuate the hydraulic pump 20 and the rotor 2 is rotated to the desired angular position. Thus, the locking of the rotor 2 can be performed efficiently.

Further, based on the detection result of the rotary encoder 29, the opening and closing of the solenoid valve 93 and the low pressure valve 58 are controlled and thus, the rotating of the rotor 2 to the desired angular position can be automated by driving the hydraulic pump 20. Thus, the locking of the rotor 2 can be performed efficiently.

In the embodiment, the solenoid valve for causing the hydraulic pump 20 to carry out the motoring operation is provided in addition to the high pressure valve 56 housed in the casing 90. This is for the following reasons.

In the example shown in FIG. 9, the high pressure valve 56 and the low pressure valve 58 that are housed in the casing 90, are a check valve and an electromagnetic valve of a normally-open type, respectively. The check valve is used as the high pressure valve 56 to reduce the size of the high pressure valve 56. When driving the hydraulic pump 20 by the pressurized oil supplied from the pressurized oil source (the pump 95), the high pressure valve (the check valve) 56 housed in the casing 90 cannot be used. Thus, in the present embodiment, an electromagnetic valve of a normally-closed type is provided as the solenoid valve 93 in addition to the high pressure valve 58.

Further, even in the case of using the electromagnetic valve as the high pressure valve 56, from the perspective of reducing the size of the high pressure valve, the high pressure valve 56 is designed to open and close by a pressure difference between the hydraulic chamber 53 and the high pressure oil line 24 or to assist the opening and closing thereof. In this manner, by using the pressure difference between the hydraulic chamber 53 and the high pressure oil line 24, the opening and closing of the small high pressure valve 56 can be controlled with a small amount of electromagnetic force. Thus, it is possible to reduce the size of the high pressure valve 56. In this case, by using the pressure difference generated by the reciprocation of the pistons 52, the high pressure valve 56 becomes openable. In such case, when the hydraulic pump 20 is driven by the pressurized oil from the pressurized oil source (the pump 95), the high pressure valve 56 cannot be solely controlled sometimes. Therefore, it is preferable to provide the solenoid valve 93 in addition to the high pressure valve 58 even in the case where the high pressure valve 56 housed in the casing is the electromagnetic valve.

While the present invention has been described with reference to exemplary embodiments, it is obvious to those skilled in the art that various changes may be made without departing from the scope of the invention.

For instance, in the first and second embodiments, the rotor 2 is locked by inserting the locking pin 9 in the first hole 10 on the rotor side and the second hole 11 on the nacelle side. However, this is not limitative, and the rotor 2 may be locked by means of any locking members other than the locking pin 9.

In the first and second embodiments, in order to stop the rotor 2 by the braking force by the hydraulic pump 20, the displacement $D_P$ of the hydraulic pump 20 is changed (see the step S8). However, this is not limitative and the pressure $P_H$ of the operating oil in the high pressure oil line 24 may be changed instead of or in addition to the displacement $D_P$. More specifically, at least one of the displacement $D_P$ and the pressure $P_H$ is changed to achieve the torque demand $T_P$ of the hydraulic pump 20 determined in the step S4 ($T_P = D_P \times P_H$).

The pressure $P_H$ of the operating oil in the high pressure oil line 24 can be adjusted, for instance, by increasing or reducing the ratio of the discharge amount ZP of the hydraulic pump 20 relative to the intake amount QM of the hydraulic motor 22.

In the first and second embodiments, the locking pin 9 is manually inserted in the first hole 10 and the second hole 11. However, this is not limitative and the insertion of the locking pin 9 may be automated.

Figure 11:
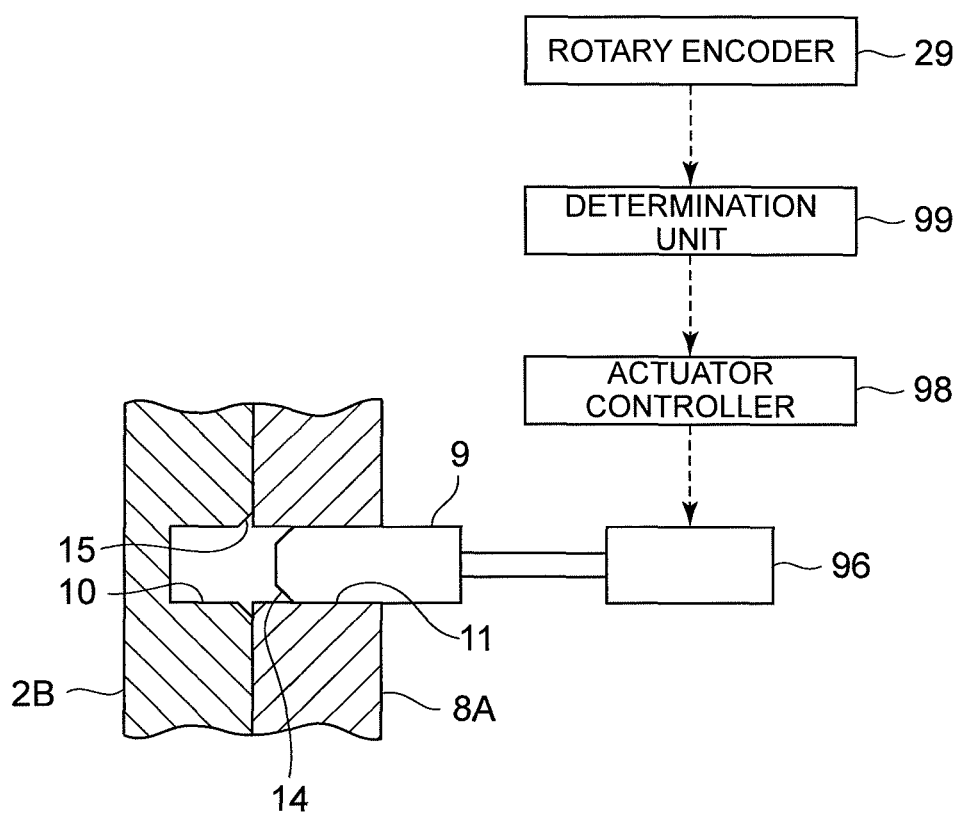
FIG. 11 illustrates an automated insertion of the locking pin.

FIG. 11 illustrates an automated insertion of the locking pin 9. As shown in FIG. 11, an actuator 96 is provided on the rear end of the locking pin 9. The actuator 96 is controlled by an actuator controller 98. A determination unit 99 determines whether or not the first hole on the rotor side (the hole formed in the hub 2B in FIG. 11) matches with the second hole 11 on the nacelle side (the hole formed in the convex portion 8A of the nacelle 8 in FIG. 11) based on the detection result of measuring the angular position of the rotor 2 by the rotary encoder 29 (see FIG. 1 and FIG. 9). If it is determined that the first hole 10 matches with the second hole 11, the actuator controller 98 actuates the actuator to insert the locking pin 9 in the first hole 10 and the second hole 11. As the actuator 96, a hydraulic cylinder may be used for instance.

REFERENCE SIGNS LIST

1 WIND TURBINE GENERATOR
2 ROTOR
2A BLADE
2C MAIN SHAFT
3 MAIN SHAFT BEARING
4 HYDRAULIC TRANSMISSION
5 FASTENING MEMBER
6 GENERATOR
7 TOWER
8 NACELLE
8A CONVEX PORTION
9 LOCKING PIN
10 FIRST HOLE
11 SECOND HOLE
12 CYLINDRICAL MEMBER
13 SCREW MEMBER
14 CORNER PORTION
15 CORNER PORTION
20 HYDRAULIC PUMP
22 HYDRAULIC MOTOR
24 HIGH PRESSURE OIL LINE
26 LOW PRESSURE OIL LINE
28 PRESSURE SENSOR
29 ROTATARY ENCODER
30 CONTROL UNIT
32 PITCH CONTROLLER
36 MOTOR CONTROLLER
38 ACC VALVE CONTROLLER
39 VALVE CONTROLLER
40 PITCH DRIVE MECHANISM
42 HYDRAULIC CYLINDER
44 SERVO VALVE
46 PRESSURIZED OIL SOURCE
48 ACCUMULATOR
50 CYLINDER
52 PISTON
52A PISTON BODY
52B PISTON ROLLER
53 HYDRAULIC CHAMBER
54 CAM (RING CAM)
55 CAM MOUNT
56 HIGH PRESSURE VALVE
57 HIGH PRESSURE CONDUIT
58 LOW PRESSURE VALVE
59 LOW PRESSURE CONDUIT
60 (60A, 60B) ACCUMULATOR
62 (62A, 62B) ACCUMULATOR VALVE
64 ACCUMULATOR
66 OIL FILTER
68 OIL COOLER
70 BYPASS FLOW PATH
72 RELIEF VALVE
80 OIL TANK
82 REPLENISHMENT LINE
84 PUMP
86 OIL FILTER
88 RETURN LINE
89 RELIEF VALVE
90 CASING
90A END PLATE
90B END PLATE
90C CYLINDRICAL WALL
91 THROUGH-HOLE
92 SUPPLY PATH (SUPPLY PATH FOR PRESSURIZED OIL)

93 SOLENOID VALVE (VALVE)
94 CHECK VALVE
96 ACTUATOR
98 ACTUATOR CONTROLLER
99 DETERMINATION UNIT

The invention claimed is:

1. A rotor locking method for a power generating apparatus of renewable energy type comprising: a rotor including a blade, a hub on which the blade is mounted and a main shaft coupled to the hub; a hydraulic pump of variable displacement type driven by rotation of the rotor; a hydraulic motor driven by operating oil whose pressure is increased by the hydraulic pump; and a generator coupled to the hydraulic motor, the method comprising the steps of:

decelerating the rotor by adjusting a pitch angle of the blade:
after the decelerating step, stopping the rotor by applying a braking force by the hydraulic pump to the rotor; and
locking the rotor so that the rotor is immovable in a rotation direction,
wherein the power generating apparatus of renewable energy type further comprises:
an encoder for detecting an angular position of the rotor; and
a high pressure oil line for supplying the operating oil from the hydraulic pump to the hydraulic motor, and
wherein, in the locking step, the rotor is stopped at a target angular position by adjusting at least one of a displacement of the hydraulic pump and a pressure of the operating oil in the high pressure oil line based on a detection result detected by the encoder.

2. The rotor locking method for the power generating apparatus of renewable energy type according to claim 1,
wherein, in the locking step, a locking pin is inserted in a first hole formed on a rotor side and a second hole formed on side of a nacelle housing the main shaft, and
wherein the target angular position is such an angular position that the first hole formed on the rotor side matches with the second hole formed on the nacelle side.

3. A rotor locking method for a power generating apparatus of renewable energy type comprising: a rotor including a blade, a hub on which the blade is mounted and a main shaft coupled to the hub; a hydraulic pump of variable displacement type driven by rotation of the rotor; a hydraulic motor driven by operating oil whose pressure is increased by the hydraulic pump; and a generator coupled to the hydraulic motor, the method comprising the steps of:

decelerating the rotor by adjusting a pitch angle of the blade:
after the decelerating step, stopping the rotor by applying a braking force by the hydraulic pump to the rotor; and
after the stopping step, locking the rotor so that the rotor is immovable in a rotation direction,
wherein, in the locking step, a locking pin is inserted in a first hole formed on a rotor side and a second hole formed on a side of a nacelle housing the main shaft, and
wherein the method further comprises the step of
after the stopping step and before the locking step, matching the first hole formed on the rotor side with the second hole formed on the nacelle side by driving the hydraulic pump in a motoring mode by pressurized oil supplied to the hydraulic pump and rotating the rotor.

4. The rotor locking method for the power generating apparatus of renewable energy type according to claim 3,
wherein the power generating apparatus of renewable energy further comprises an encoder which detects an angular position of the rotor, and
wherein, in the matching step, opening and closing of a valve provided in a supply path of supplying the pressurized oil to the hydraulic pump, is controlled based on a detection result of the encoder so as to match the first hole with the second hole.

5. The rotor locking method for the power generating apparatus of renewable energy type according to claim 1,
wherein the power generating apparatus of renewable energy type further comprises a low pressure oil line which returns the operating oil from the hydraulic motor to the hydraulic pump,
wherein the hydraulic pump comprises: a cylinder; a piston sliding in the cylinder in response to the rotation of the rotor; a working chamber formed by the cylinder and the piston; a high pressure valve opening and closing a conduit between the working chamber and the high pressure oil line; and a low pressure valve opening and closing a conduit between the working chamber and the low pressure oil line, and
wherein the method further comprises the step of
after the stopping step and before the locking step, temporarily locking the rotor in such a state that the high pressure valve and the low pressure valve are maintained closed.

6. The rotor locking method for the power generating apparatus of renewable energy type according to claim 1,
wherein the power generating apparatus of renewable energy type further comprises a high pressure oil line which supplies the operating oil from the hydraulic pump to the hydraulic motor,
wherein, to the high pressure oil line, an accumulator is connected via an accumulator valve, and
wherein, in the stopping step, at least a displacement of the hydraulic motor is increased and excess of the operating oil in the high pressure oil line is accumulated in the accumulator by opening the accumulator valve.

7. The rotor locking method for the power generating apparatus of renewable energy type according to claim 1,
wherein the hydraulic motor is a variable displacement type, and
wherein, in the stopping step, at least a displacement of the hydraulic pump is increased and excess of the operating oil in the high pressure oil line is absorbed in the hydraulic motor by temporarily increasing a displacement of the hydraulic motor.

8. A rotor locking method for a power generating apparatus of renewable energy type comprising: a rotor including a blade, a hub on which the blade is mounted and a main shaft coupled to the hub; a hydraulic pump of variable displacement type driven by rotation of the rotor; a hydraulic motor driven by operating oil whose pressure is increased by the hydraulic pump; and a generator coupled to the hydraulic motor, the method comprising the steps of:

decelerating the rotor by adjusting a pitch angle of the blade;
after the decelerating step, stopping the rotor by applying a braking force by the hydraulic pump to the rotor; and
locking the rotor so that the rotor is immovable in a rotation direction;
wherein the power generating apparatus of renewable energy type further comprises: a high pressure oil line which supplies the operating oil from the hydraulic pump to the hydraulic motor; a low pressure oil line which returns the operating oil from the hydraulic motor to the hydraulic pump; a bypass flow path which connects the high pressure oil line to the low pressure oil line and bypasses the hydraulic motor; and a relief valve which is provided in the bypass flow path, and wherein, in the stopping step, at least a displacement of the hydraulic pump is increased and excess of the operating oil in the high pressure oil line is released to the low pressure oil line via the bypass flow path and the relief valve.

9. The rotor locking method for the power generating apparatus of renewable energy type according to claim 1, wherein the power generating apparatus of renewable energy type is a wind turbine generator which rotates the rotor by wind in a form of renewable energy, input a torque of the rotor to the generator via the hydraulic pump and the hydraulic motor, and generates electric power in the generator.

10. A power generating apparatus of renewable energy type, comprising:

a rotor including a blade, a hub on which the blade is mounted and a main shaft coupled to the hub;

a hydraulic pump of variable displacement type which is driven by rotation of the rotor;

a hydraulic motor which is driven by operating oil whose pressure is increased by the hydraulic pump;

a generator which is coupled to the hydraulic motor;

a pitch drive mechanism which adjusts a pitch angle of the blade to decelerate the rotor;

a pump control unit which controls the hydraulic pump to stop the rotor by applying a braking force by the hydraulic pump to the rotor having been decelerated by the pitch drive mechanism; and a locking unit which locks the rotor so that the rotor is immovable in a rotation direction, a high pressure oil line for supplying the operating oil from the hydraulic pump to the hydraulic motor, and an encoder for detecting an angular position of the rotor;

wherein the pump control unit is configured to stop the rotor at a target angular position by adjusting at least one of a displacement of the hydraulic pump and a pressure of the operating oil in the high pressure oil line based on a detection result detected by the encoder.

11. The power generating apparatus of renewable energy type according to claim 10 wherein the locking unit is a locking pin which is inserted in a first hole formed on a rotor side and a second hole formed on a nacelle side, and wherein the target angular position is such an angular position that the first hole formed on the rotor side matches with the second hole formed on the nacelle side.

12. A power generating apparatus of renewable energy type, comprising:

a rotor including a blade, a hub on which the blade is mounted and a main shaft coupled to the hub;

a hydraulic pump of variable displacement type which is driven by rotation of the rotor;

a hydraulic motor which is driven by operating oil whose pressure is increased by the hydraulic pump;

a generator which is coupled to the hydraulic motor;

a pitch drive mechanism which adjusts a pitch angle of the blade to decelerate the rotor;

a pump control unit which controls the hydraulic pump to stop the rotor by applying a braking force by the hydraulic pump to the rotor having been decelerated by the pitch drive mechanism;

a locking unit which includes a locking pin which is inserted in a first hole formed on a rotor side and a second hole formed on a nacelle side and locks the rotor so that the rotor is immovable in a rotation direction;

an encoder which detects an angular position of the rotor;

a pressurized oil source from which pressurized oil is supplied to the hydraulic pump;

a valve which is provided in a supply path of the pressurized oil from the pressurized oil source to the hydraulic pump; and a valve control unit which controls opening and closing of the valve based on a detection result of the encoder to drive the hydraulic pump in a motoring mode by the pressurized oil from the pressurized oil source and to rotate the rotor so that the first hole formed on the rotor side matches with the second hole formed on the nacelle side.

13. The power generating apparatus of renewable energy type according to claim 12, further comprising:

a high pressure oil line which supplies the operating oil from the hydraulic pump to the hydraulic motor; and a low pressure oil line which returns the operating oil from the hydraulic motor to the hydraulic pump, wherein the hydraulic pump comprises: a cylinder; a piston sliding in the cylinder in response to the rotation of the rotor; a working chamber formed by the cylinder and the piston; a high pressure valve opening and closing a conduit between the working chamber and the high pressure oil line; a low pressure valve opening and closing a conduit between the working chamber and the low pressure oil line; and a casing housing the cylinder, the piston, the working chamber, the high pressure valve and the low pressure valve, wherein the supply path of the pressurized oil extends from the pressurized oil source and penetrates the casing to be in communication with the working chamber, and wherein the valve is an electromagnetic valve arranged in the supply path of the pressurized oil.

14. The power generating apparatus of renewable energy type according to claim 13, wherein the hydraulic pump further comprises a ring cam having a wave-shaped profile of a concave-convex shape which determines a cycle of a reciprocating motion of the piston, wherein a plurality of groups of at least two of the pistons are provided, said at least two of the pistons having the same phase in the cycle of the reciprocating motion, and wherein the valve is shared by the at least two of the pistons belonging to each of the groups.

15. A power generating apparatus of renewable energy type, comprising:

a rotor including a blade, a hub on which the blade is mounted and a main shaft coupled to the hub;

a hydraulic pump of variable displacement type which is driven by rotation of the rotor;

a hydraulic motor which is driven by operating oil whose pressure is increased by the hydraulic pump;

a generator which is coupled to the hydraulic motor;

a pitch drive mechanism which adjusts a pitch angle of the blade to decelerate the rotor;

a pump control unit which controls the hydraulic pump to stop the rotor by applying a braking force by the hydraulic pump to the rotor having been decelerated by the pitch drive mechanism;

a locking unit which locks the rotor so that the rotor is immovable in a rotation direction, wherein the locking unit is a locking pin which is inserted in a first hole formed on the rotor side and a second hole formed on a side of the nacelle which houses the main shaft, wherein the hydraulic pump comprises: a plurality of cylinders; a plurality of pistons each sliding in the cylinder; and a ring cam which is arranged on an outer circumference of the main shaft and has a wave-shaped profile of a concave-convex shape which determines a cycle of a reciprocating motion of the piston, and wherein the wave-shaped profile of the ring cam is determined so that the first hole matches with the second hole when at least one of the pistons is positioned at a valley of the concave-convex shape of the ring cam.

16. The power generating apparatus of renewable energy type according to claim 10, wherein the locking unit is a locking pin which is inserted in a first hole formed on the rotor side and a second hole formed on a side of the nacelle which houses the main shaft, wherein the power generating apparatus of renewable energy type further comprises:

an encoder which detects an angular position of the rotor;

an actuator attached to the locking pin;

a determination unit which determines whether or not the first hole matches with the second hole based on a detection result of the encoder; and an actuator control unit which, when it is determined that the first hole matches with the second hole, causes the actuator to push the locking pin in the first hole and the second hole.

17. The power generating apparatus of renewable energy type according to claim 10, wherein the locking unit is a locking pin which is inserted in a first hole formed on the rotor side and a second hole formed on a nacelle side, and wherein a tip surface of the locking pin is chamfered as well as an opening end surface of at least one of the first and second holes which is on a side opposing an insertion direction of the locking pin.

18. The rotor locking method for the power generating apparatus of renewable energy type according to claim 3, wherein the rotation of the rotor in the action of driving the hydraulic pump in the motoring mode is accomplished via the driving of the hydraulic pump in the motoring mode.

19. The power generating apparatus of renewable energy type according to claim 12, wherein the power generating apparatus is configured to rotate the rotor the driving of the hydraulic pump in the motoring mode.

* * * * *